United States Patent [19]

Suto et al.

[11] 4,414,012
[45] Nov. 8, 1983

[54] FABRICATION METHODS OF DOPED SILICA GLASS AND OPTICAL FIBER PREFORM BY USING THE DOPED SILICA GLASS

[75] Inventors: Shoichi Suto; Hiroyuki Suda; Fumiaki Hanawa; Motohiro Nakahara, all of Mito; Nobuo Inagaki, Katsuta, all of Japan

[73] Assignee: Nippon Telegraph & Telephone Public Corporation, Tokyo, Japan

[21] Appl. No.: 300,296

[22] Filed: Sep. 8, 1981

[30] Foreign Application Priority Data

Sep. 11, 1980 [JP] Japan ............................ 55/126556
Sep. 16, 1980 [JP] Japan ............................ 55/127102
Nov. 4, 1980 [JP] Japan ............................ 55/154960
Nov. 4, 1980 [JP] Japan ............................ 55/154961
Nov. 26, 1980 [JP] Japan ............................ 55/166262
Apr. 13, 1981 [JP] Japan ............................ 56/54332
Apr. 13, 1981 [JP] Japan ............................ 56/54334

[51] Int. Cl.³ .................... C03B 19/06; C03B 20/00
[52] U.S. Cl. ............................. 65/18.2; 65/3.12; 65/30.1
[58] Field of Search .................... 65/18.2, 30.1, 3.12

[56] References Cited

U.S. PATENT DOCUMENTS

| | | | |
|---|---|---|---|
| 3,859,073 | 1/1975 | Schultz | 65/3.12 X |
| 3,864,113 | 2/1975 | Dumbaugh, Jr. et al. | 65/18.2 X |
| 4,062,665 | 12/1977 | Izawa et al. | 65/3.12 |
| 4,148,621 | 4/1979 | Gliemeroth | 65/3.12 |
| 4,217,027 | 8/1980 | MacChesney et al. | 65/3.12 X |
| 4,263,031 | 4/1981 | Schultz | 65/30.1 X |
| 4,345,928 | 8/1982 | Kawachi et al. | 65/18.2 |

FOREIGN PATENT DOCUMENTS 54-103058 8/1979 Japan ............................ 65/18.2
55-144429 11/1980 Japan ............................ 65/3.12
55-144430 11/1980 Japan ............................ 65/3.12

OTHER PUBLICATIONS

Izawa et al, "Continuous Fabrication Process for High-Silica Fiber Preforms"; Transactions IECE of Japan, vol. E62, No. 11, Nov. 1979, pp. 779–785.

Primary Examiner—Richard V. Fisher
Attorney, Agent, or Firm—Cushman, Darby & Cushman

[57] ABSTRACT

Manufacturing method of doped silica glass suitable for optical fiber wherein quartz powder or SiO$_2$ glass fine particles are exposed to a gas for producing the doped silica glass containing SiCl$_4$, a gaseous additive and water vapor (H$_2$O) to add the dopant to the glass body, and then the resulting glass body is fused at a high temperature, thereby producing a transparent doped silica glass in which the production of the glass particles, the addition of the dopant, and the vitrification of the glass body are carried out by separate steps under respective suitable conditions. The manufacturing speed is remarkably increased because of the separate steps. The content of the dopant is not limited, but can be adjusted with any desired amount by changing the reaction time of dissolution. Dopant components like PbO$_2$, SnO$_2$, ZnO which were typically not added to the glass body can now be added thereto. Also, a method of manufacturing an optical fiber preform is disclosed wherein the doped silica glass is deposited and fused on a starting material which is inclined by an angle within a range of 5°–90° with respect to a blow-off direction of the flow of the doped silica glass to form a transparent doped silica glass body having a uniform outer diameter and a uniform boundary surface at a high synthesizing speed. This latter method aids mass production of optical fibers at low cost.

17 Claims, 34 Drawing Figures

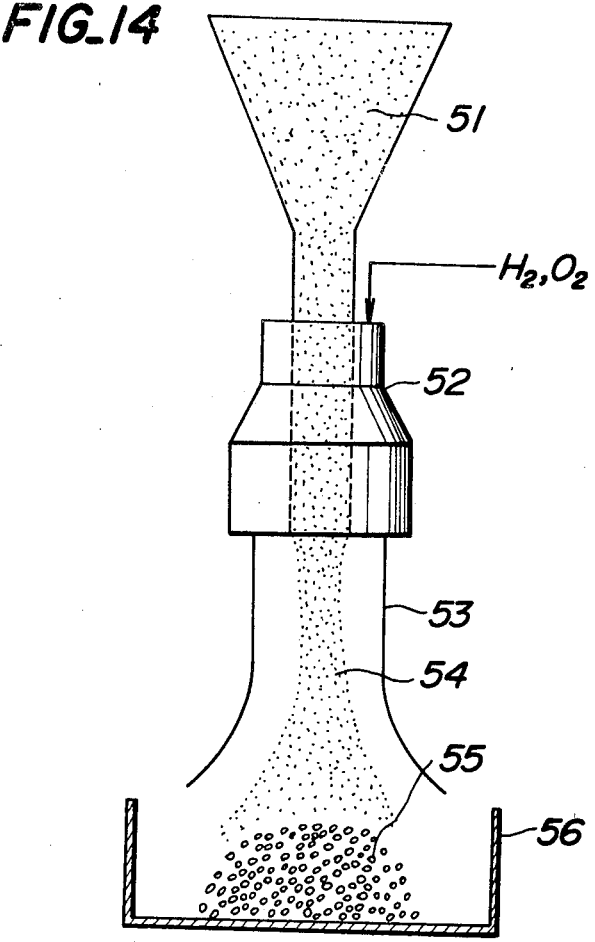
FIG_14
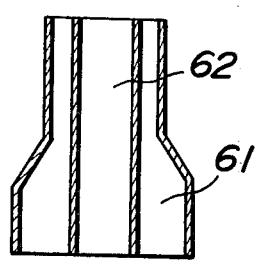
FIG_15A
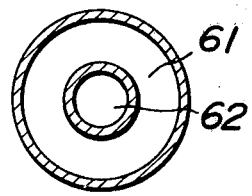
FIG_15B

FIG_16A
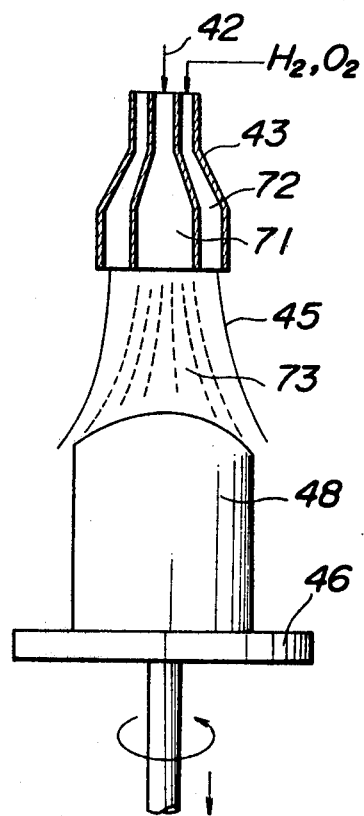
FIG_16B
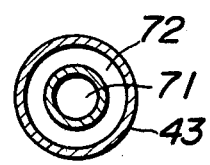
FIG_17
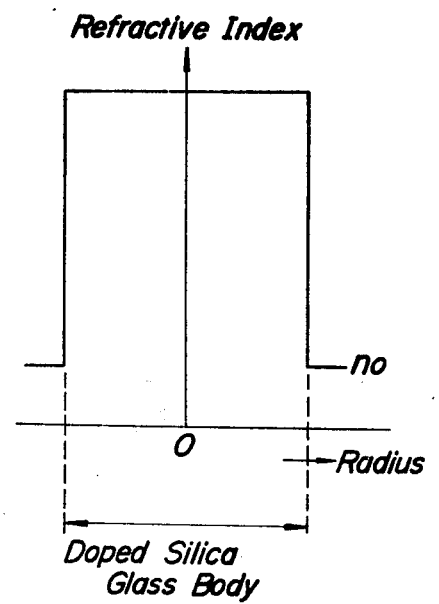

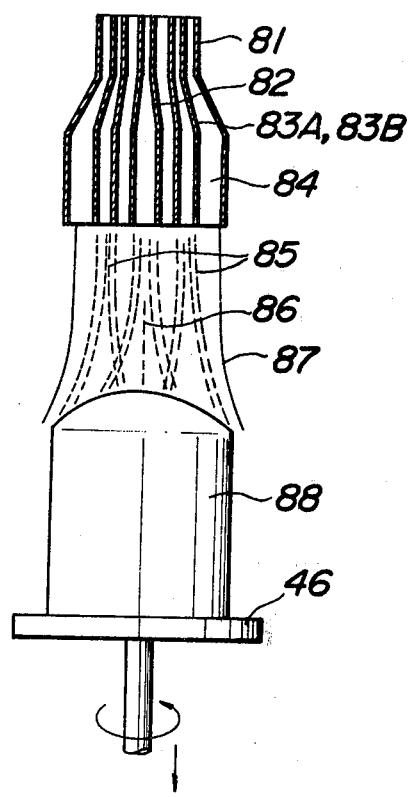
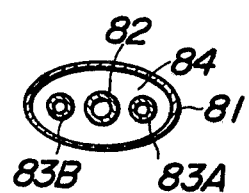
FIG.18A
FIG.18B

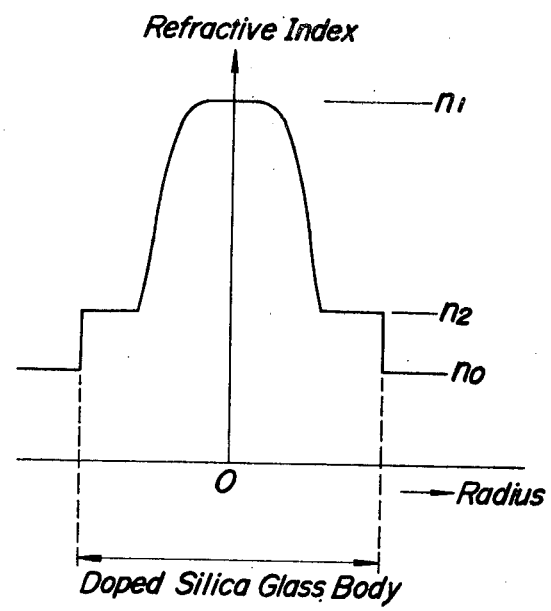
FIG_19
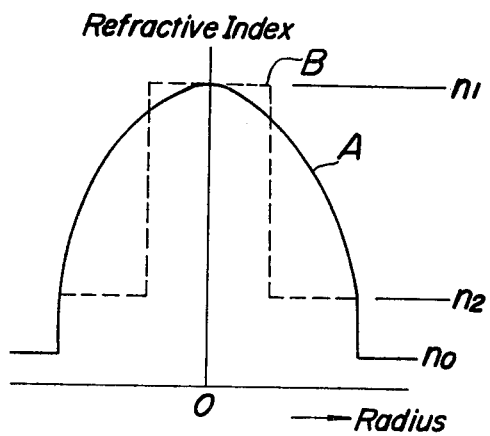
FIG_20

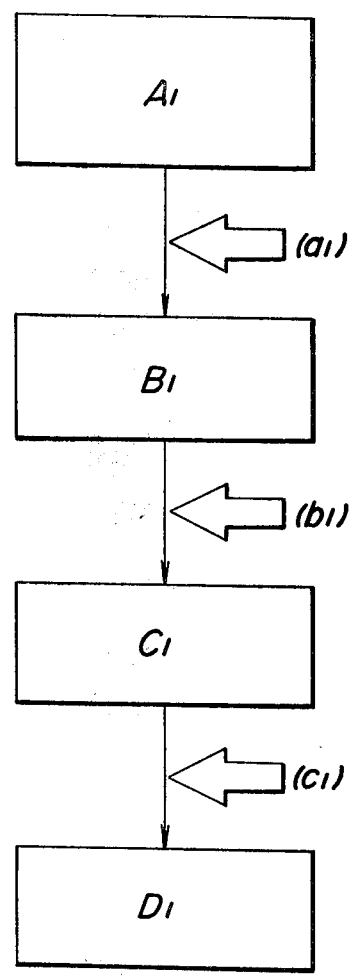

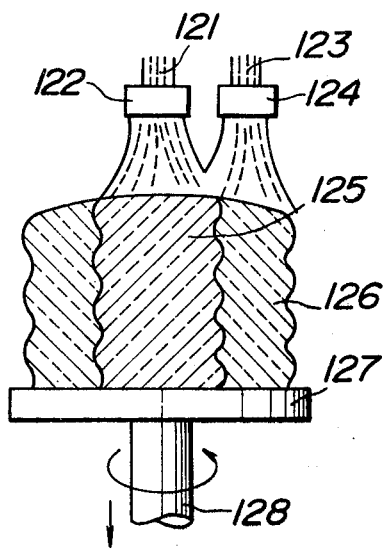
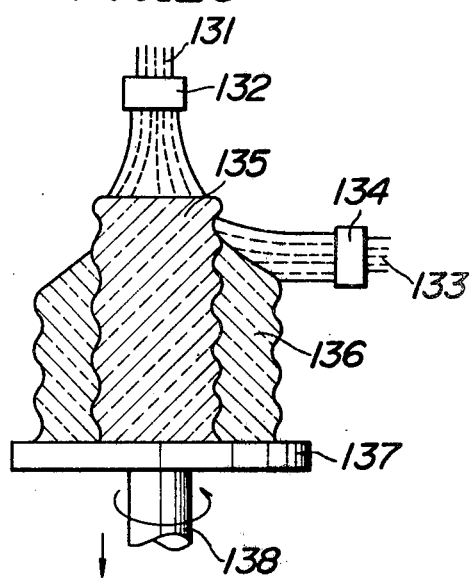
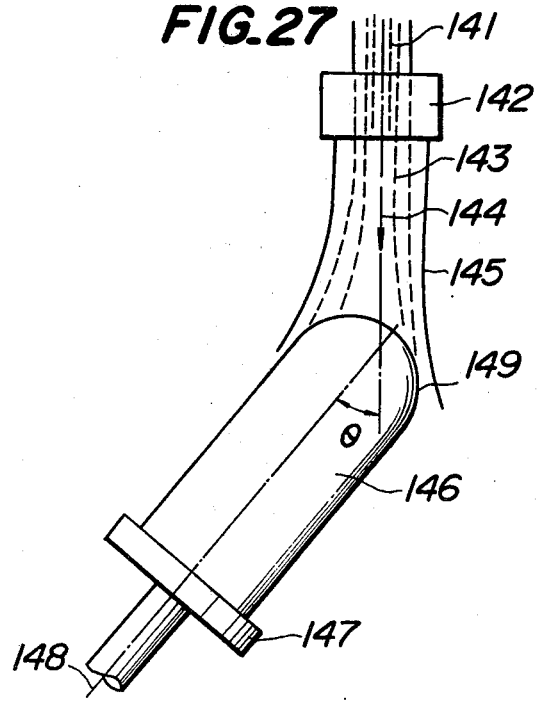

FABRICATION METHODS OF DOPED SILICA GLASS AND OPTICAL FIBER PREFORM BY USING THE DOPED SILICA GLASS

BACKGROUND OF THE INVENTION

This invention relates to a method of manufacturing doped silica glass and a method of manufacturing an optical fiber preform by utilizing the resulting doped silica glass manufactured by the former method.

A doped silica glass containing principally $GeO_2$ as a dopant and optionally diphosphorous pentoxide ($P_2O_5$), diboron trioxide ($B_2O_3$) and the like as additional dopants has been employed as a material for optical fiber.

Heretofore, this type of the production of doped silica glass has been carried out mainly in accordance with the following three types of soot processes:

(1) CVD Process (Inside Vapor Phase Oxidation Method) (see U.S. Pat. No. 4,217,027)

In this process, the side of a quartz tube is heated by a flame at a temperature of about 1,500°–1,700° C., and $SiCl_4$ and a compound of dopant, e.g., $GeCl_4$ supplied into the quartz tube in gaseous phase is subjected to thermal oxidation to form a doped silica glass layer. In this case, $SiCl_4$ and $GeCl_4$ become $SiO_2$ and $GeO_2$ glass fine particles and at the same time, form a transparent $GeO_2$ doped silica glass body by the thermal oxidation reaction. Such operation is repeated to obtain a desired thickness of the doped silica glass layer. Then, when the flame is permitted to attain a temperature of about 1,700°–1,800° C., the quartz tube shrinks to make the glass layer solid, thereby producing an optical fiber preform. In this process, the synthesis of silica glass fine particles, addition of $GeO_2$ and vitrification of the silica glass fine particles are simultaneously carried out in accordance with thermal oxidation reaction by the same heat source.

(2) OVPO Method (Outside Vapor Phase Oxidation Method) (see U.S. Pat. No. 3,859,073)

In this method, fine glass particles consisting of $SiO_2$ and $GeO_2$ synthesized in a flame are jetted on the side of a rotating starting material (mandrel) to obtain a porous silica glass sintered body containing $GeO_2$. The resulting hollow round bar-like porous silica glass sintered body is heated and vitrified by means of a ring-like heater element at a temperature of about 1,500°–1,600° C., thereby to obtain a transparent $GeO_2$ doped silica glass body. This $GeO_2$ doped silica glass body is inserted into a quartz tube to obtain an optical fiber preform. In the method, the synthesis of silica glass fine particles, addition of $GeO_2$ and sintering are simultaneously effected by the same heat source, whilst only vitrification is carried out in accordance with a separate step.

(3) VAD Method (Vapor-Phase Axial Deposition Method) (see U.S. Pat. No. 4,062,665)

Glass forming raw materials such as $SiCl_4$, $GeCl_4$ and the like as well as an $O_2$–$H_2$ flame stream consisting of $H_2$, $O_2$ and insert gases are blown off from a synthesizing torch connected to a feed pipe for the glass forming raw materials and a feed pipe for $H_2$–$O_2$ gases, whereby the aforesaid glass forming raw materials are subjected to flame hydrolysis to produce glass fine particles like $SiO_2$, $GeO_2$ and at the same time, the fine glass particles are sintered by the same flame stream to form a porous glass body. This porous glass body is successively deposited on the extreme end of a supporting rod being moved upwardly by pulling up the same while rotating by means of a rotary pulling-up device to fabricate a porous silica glass sintered body containing $GeO_2$. Then, the resulting porous silica glass sintered body is heated and fused by means of a heater element disposed on the upper portion of the apparatus at a temperature of about 1,500°–1,600° C. to effect vitrification, and as a result, a transparent $GeO_2$ doped silica glass body is produced. The resultant $GeO_2$ doped silica glass body is inserted into a quartz tube to use the same as an optical fiber preform. In this method, the synthesis of fine glass particles, addition of $GeO_2$ and sintering are simultaneously carried out by the same heat source similarly to that in the above outside vapor phase oxidation method, and on the other hand, the deformation and virtification steps are carried out by means of the ring-like heater element disposed on the upper portion of the apparatus.

Simple explanations have been made about three typical methods for manufacturing doped silica glass for optical fiber fabrication which are practised at present, but these conventional methods have the following various disadvantages.

First, in a conventional method (soot process) for manufacturing doped silica glass, increasing the amount of glass forming raw materials supplied per unit time and therefore, the rate of production of the doped silica glass, decreases efficiency of synthesizing the glass fine particles by flame hydrolysis. Besides, since the synthesis of glass fine particles, addition of $GeO_2$ and sintering are simultaneously carried out by the same heat source, when the amount of glass forming raw materials is increased, the sintering becomes insufficient so that formation of the porous glass body becomes difficult.

According to the study by the present inventors, it was found that because of the limitation as mentioned above, it was difficult to obtain 500 g or more of production per unit time in accordance with the manufacturing method of the doped silica glass by employing the soot process and furthermore, efficiency of 80% in the production thereof was the upper limit in such process.

In order to avoid the disadvantages of the soot process as to increasing the rate of fabrication of a glass body, arising when a transparent glass body is directly produced from fine glass particles (a so-called direct vitrification process), $GeO_2$ cannot be added to the transparent glass body, and as a result, doped silica glass cannot be obtained.

In case of these conventional methods, synthesis of fine glass particles, addition of $GeO_2$ and sintering have simultaneously been effected by the same heat source, and in case of inside vapor phase oxidation method, even vitrification has simultaneously been made with the above other steps by the same heat source. For this reason, adjusting the conditions suitable for synthesis of fine glass particles, addition of $GeO_2$ and sintering thereof, has been difficult. Thus, increase in the rate of production of doped silica glass which is, homogeneous and transparent doped cannot be obtained.

For instance, in order to improve the rate of production in an inside vapor phase oxidation method, when the amount of $SiCl_4$ and $GeCl_4$ was increased ($SiCl_4/GeCl_4$ ratio being constant), there arose such a problem that the vitrification was not sufficient, and porous glass sintered bodies remained as a lamellar constituents. Then, when the flame temperature was further raised to accelerate the reaction and at the same time to form perfectly a transparent glass body, there occurred a problem that a ratio of $GeO_2$ content in the formed doped silica glass layer decreased. In order to improve the rate of production and to obtain doped silica glass having desired characteristics in CVD method, a fine adjustment of the conditions for synthesizing glass fine particles is required, for adding $GeO_2$ and for effecting vitrification so as to set optimum synthesizing conditions. Therefore, there has naturally been a limitation for improving the rate of production. A similar tendency can also be observed in the OVPO method and the VAD method, respectively. That is, there was a disadvantage in that when the amounts of $SiCl_4$ and $GeCl_4$ were increased, the degree of sintering in the formed porous sintered body was decreased to generate "cracking" etc., so that a porous glass sintered body for an optical fiber preform could not be produced.

On the other hand, in order to improve the above stated disadvantage, when the flame is intensified, there arose a problem that the $GeO_2$ content was decreased. Thus, simple adjustment of fabrication conditions, in order to increase the rate of production of doped silica glass is not possible.

The above discussion may also be applied for the case where a doped silica glass is produced by utilizing $PbO_2$ or $SnO_2$ as a dopant.

According to these conventional methods, however, when it is intended that the amount of glass-forming raw materials etc. per unit time is increased and the rate of production of doped silica glass is increased, efficiency for synthesizing glass fine particles decreases and at the same time, the sintering thereof becomes insufficient, so that it is difficult to form a porous glass body. On the other hand, for the sake of improving the efficiency for synthesizing glass fine particles and making the sintering sufficient, when it is contemplated that the temperature of the oxy-hydrogen flame is raised and the rate of the production of doped silica glass is improved, no dopant $PbO_2$ or $SnO_2$ can be added.

For these reasons as mentioned above, these conventional methods could not avoid such disadvantages that doped silica glass must be produced matching the rate in production of the doped silica glass and the amount of a dopant which is added, so that the amount of $PbO_2$ or $SnO_2$ which can be added to the glass fine particles was a very minor amount, while the rate of the production was also slow.

SUMMARY OF THE INVENTION

In view of the above-mentioned various disadvantages of prior art, a main object of the present invention is to provide a method of manufacturing doped silica glass of good quality at a high rate.

It is another object of the invention to provide a method of effectively manufacturing homogeneous and transparent doped silica glass and in which dopant content is easily controlled.

A further object of the invention is to provide a method of manufacturing doped silica glass at a high speed which is sufficiently doped with a dopant such as $PbO_2$, $SnO_2$, ZnO or the like which is difficult to be added to the silica glass by a conventional soot process.

Still another object of the invention is to provide a method of manufacturing doped silica glass in which distribution of a dopant in a radial direction of the doped silica glass can be controlled to obtain a desired distribution.

A still further object of the invention is to provide a method of manufacturing doped silica glass with a low OH ion content and in which evaporation of a dopant can remarkably be reduced.

A further object of the invention is to provide a method of manufacturing a transparent doped silica glass without any residual bubble at a high manufacturing speed.

Yet another object of the invention is to provide a method of manufacturing an optical fiber preform by utilizing doped silica glass in which the optical fiber preform having a uniform outer diameter and a uniform boundary surface of the core-clad can be produced at a high synthesizing rate.

In the present invention, a method of manufacturing doped silica glass comprises a first process for synthesizing silica glass fine particles, each having a diameter of around 0.05–0.2 μm, through thermal oxidation or flame hydrolysis of an easily oxidizable silicon compound such as $SiCl_4$, $SiH_4$ or $SiHCl_3$, a second process for forming doped silica glass fine particles by dissolving a gaseous additive of an easily oxidizable compound for producing a dopant such as $GeCl_4$, $SnCl_4$, $PbCl_4$, $ZnCl_4$, $POCl_3$, $PCl_3$, $TiCl_4$, $BBr_3$, $BCl_3$ or the like which is capable of forming a solid solution with the aforesaid silica glass fine particles through the reaction of a gaseous additive containing the easily oxidizable compound for producing a dopant, i.e., the easily oxidizable silicon compound with water vapor or oxygen on the surface of the resulting synthesized silica glass fine particles, and a third process for sintering the doped silica glass fine particles to vitrify the same, and each heat treatment in each of the processes is performed by using separate heat source.

In the second process, the silica glass fine particles are exposed to the gas for forming the doped silica glass containing the aforesaid gaseous additive for producing a dopant and water vapor or oxygen at a temperature of 500°–1,000° C. in case of thermal hydrolysis or of 800°–1,200° C. in case of thermal oxidation to effect the thermal hydrolysis or oxidation, so that an $SiO_2$-dopant solid solution is formed on the surface of the silica glass fine particle. In the third process, the vitrification of the doped silica glass fine particles may directly be effected at a temperature of 1,500°–1,700° C. Alternatively, a porous doped silica glass body may be produced by heating the doped silica glass fine particles at a temperature of 1,200°–1,400° C. and then, the resulting porous doped silica glass body may be subjected to vitrification at a temperature of 1,500°–1,700° C. In this case, for example, quartz powder with 1,000 mesh or more may be utilized in place of the silica glass fine particles.

In accordance with the method of manufacturing doped silica glass according to the present invention, the quartz powder or $SiO_2$ glass fine particles are exposed to a gas for producing the doped silica glass containing $SiCl_4$, a gaseous additive and water vapor ($H_2O$) to add the dopant to the glass body, and then the resulting glass body is fused at a high temperature, thereby producing a transparent doped silica glass in which the production of the glass particles, the addition of the dopant, and the vitrification of the glass body are carried out by separate steps under respective suitable conditions. Consequently, the manufacturing speed is not limited in the method of this invention by such various factors as mentioned above, and accordingly the invention has an advantage of being capable of remarkably increasing the producing speed per unit time. In addition, decrease of content of the dopant components in the doped silica glass can be suppressed by dissolving the dopant components such as $GeO_2$ or the like into the silica glass. The dopant can suitably be adjusted with any desired amount by changing the reaction time of the dissolution in the method of the present invention. In addition to the above, dopant components such as $PbO_2$, $SnO_2$, ZnO or the like which are difficult to add to the glass body in a conventional soot process can easily be added in a controlled amount according to the method of this invention.

According to the present invention, quartz powder may be employed as a glass-forming raw material, so that inexpensive doped silica glass can be produced. Moreover, since a distribution in concentration of the dopant in the doped silica glass becomes uniform when, for instance, an optical fiber is manufactured by using this doped silica glass, there is an advantage of being capable of manufacturing an optical fiber having a low transmission loss.

The synthesis of the doped silica glass fine particles in the second process is carried out by dissolving, for example, dopant components containing, for example, principally $GeO_2$, i.e., $GeO_2$ alone or the combination of $GeO_2$, $P_2O_5$ and $B_2O_3$ into the silica glass fine particles. For the sake of simplicity, explanation will be made in connection with the addition of $GeO_2$ alone hereinbelow. The second process of this invention has been made on the basis of the following discovery. That is, when $GeO_2$ glass fine particles or $GeO_2$ grains are simply mixed with silica glass fine particles, only $GeO_2$ evaporates selectively in the succeeding sintering or vitrifying step, so that it is difficult to obtain doped silica glass having a desired amount of $GeO_2$ content, and no addition of $GeO_2$ can be made according to circumstances. In this respect, the second process of the invention is arranged in such a manner that $GeO_2$ is allowed to be dissolved into $SiO_2$ so that $GeO_2$ is added to $SiO_2$ (dissolution of $GeO_2$). As a result, the evaporation of $GeO_2$ is prevented during sintering and vitrification and doped silica glass fine particles with a desired $GeO_2$ content are obtained.

The dissolution of $GeO_2$ is effected in such a manner that an easily oxidizable germanium compound such as $GeCl_4$ and an easily oxidizable silicon compound are subjected to thermal hydrolysis on the surfaces of silica glass fine particles to cause the following reactions (1) and (2).

$$SiCl_4 + 2H_2O \rightarrow SiO_2 + 4HCl \quad (1)$$

$$GeCl_4 + 2H_2O \rightarrow GeO_2 + 4HCl \quad (2)$$

As a result, a glass layer in which $GeO_2$ is dissolved into $SiO_2$ is formed on the surfaces of the aforesaid fine particles. Such dissolution is practically carried out in such a manner that a rotating reaction vessel is loaded with silica glass fine particles, and the so loaded silica glass fine particles are exposed to a reaction gas containing $SiCl_4$, $GeCl_4$ and $H_2O$ at a temperature of about 500°–1,000° C. The dissolution of $GeO_2$ to $SiO_2$ in accordance with the second process can be ascertained by the observation of absorption in the vicinity of 660 $cm^{-1}$ in infrared absorption characteristics. As a matter of course, any such absorption cannot be observed in a simple mixture of $SiO_2$ and $GeO_2$. In the case where the dopant components contain $P_2O_5$ and $B_2O_3$ other than $GeO_2$, dissolution is carried out by adding $POCl_3$, $PCl_3$, $BBr_3$, $BCl_3$ or the like to the glass particles, like the dissolution mentioned above.

In the third process, the doped silica glass fine particles are sintered by means of an oxy-hydrogen flame, plasma flame, high temperature electric furnace or the like to fabricate a porous glass sintered body, and then, the resultant porous glass sintered body is deformed and vitrified to obtain a transparent glass body. In this case, if the heating temperature is raised, transparent doped silica glass can directly be obtained without forming the sintered body in appearance. In the sintering process, such doped silica glass fine particles may be shaped into a desired form in advance by using a high-pressure pressing method.

When the doped silica glass body fabricated by the aforesaid process is adopted as a core material and is embedded in a quartz glass tube, an optical fiber preform is obtained. The resulting optical fiber preform is subjected to wire drawing to manufacture an optical fiber having a transmission loss of 5 dB/km or less.

In the case where a transparent doped silica glass body is produced from doped silica glass powder into which $GeO_2$, $PbO_2$, $SnO_2$ or the like are dissolved by exposing the silica glass powder to a reaction gas containing $SiCl_4$ as well as at least one member selected from the group consisting of $GeCl_4$, $POCl_3$, $PCl_3$, $TiCl_4$, $BBr_3$, $BCl_3$ and the like as described above, such doped silica glass powder is utilized, as it stands, to deposit and fuse the same on the extreme end of a starting material to produce the doped silica glass body. This causes a disadvantage in that when the deposition and dissolution speeds of the aforesaid doped silica glass fine particles are increased, fine bubbles are contained in the resulting transparent doped silica glass body.

For instance, in the case where the doped silica glass fine particles prepared by dissolving 10 mol% of $GeO_2$ into silica glass fine particles each having a diameter of 500–2,000 Å and synthesized by means of flame hydrolysis or thermal oxidation reaction are blown off into a flame or plasma flame to deposit and fuse the doped silica glass fine particles on the extreme end of the starting material, a transparent doped silica glass body can be obtained when a blow-off amount of the doped silica glass particles is 10 g per minute. When, however, the blow-off amount is increased to 100 g per minute, there arises a disadvantage in that a number of bubbles each having a diameter of around 0.01–1 mm remain in the doped silica glass body.

Therefore, in the method of manufacturing doped silica glass according to the invention, it is preferable that the doped silica glass powder is subjected to a heat treatment prior to depositing and fusing the doped silica glass powder, into which a dopant has been dissolved, on the extreme end of the starting material by means of flame or plasma flame. In this case, such heat treatment may be carried out by means of flame, plasma flame or high temperature electric furnace, and the temperature of the heat treatment is preferably within a range of 1,000°–2,000° C.

By heat-treating the doped silica glass fine particles, the diameter of the fine glass particles can be increased, so that a transparent doped silica glass body can be produced at a high speed without residual bubbles. For this reason, there is an advantage in that an inexpensive optical fiber can be obtained, when this doped silica glass body is utilized to manufacture the optical fiber.

In the present invention, since a $SiO_2$-dopant solid solution is formed, there is also such an advantage that evaporation of a dopant such as $GeO_2$ is not substantial in the vitrification step. However, this does not mean that there is no evaporation of a dopant such as $GeO_2$, but that such evaporation is less than that of a conventional soot process. Accordingly, in order to remarkably reduce the evaporation of such dopant, it is preferable that quartz powders or $SiO_2$ glass fine particles are exposed to a gas for forming doped silica glass containing water vapor and a gaseous additive which reacts with $SiCl_4$ and $H_2O$ at a temperature of 500°–1,000° C. to produce a dopant being capable of forming a solid solution with $SiO_2$, thereby forming a $SiO_2$-dopant solid solution. Then, the resulting solid solution is further exposed to an atmospheric gas containing $SiCl_4$ and water vapor at a temperature of 500°–1,200° C. to form an $SiO_2$ glass layer on the surface of the doped silica glass fine particle, and thereafter these resulting doped silica glass fine particles are vitrified.

According to such method of manufacturing doped silica glass of the present invention as stated above, the $SiO_2$ layer is further laminated on the surface of the doped silica glass particles, so that a dopant (e.g., $GeO_2$) in the $SiO_2$-dopant solid solution does not volatilize even in high temperature treatment in the vitrification step, and thus there is an advantage in that doped silica glass having a desired concentration of dopant can be obtained.

Doped silica glass with a low OH ion content may also be produced in that a gas for dehydrating treatment containing a chlorine compound such as $SOCl_2$, $Cl_2$ or the like is included in the above-mentioned first, and second process and heat treatment upon the doped silica glass fine particles, or the step for forming the $SiO_2$ glass layer on the surface of the doped silica glass fine particle after the second process.

Furthermore, in order to control distribution of a dopant in the radial direction of the doped silica glass to obtain a desired distribution, it is preferable, in the vitrification process after the production of the doped silica glass fine particles by forming the $SiO_2$-dopant solid solution, that separate groups of doped silica glass fine particles which are different from one another in their amounts of dissolved dopant are jetted from respective separate feed openings to control the distribution of the dopant, and then the doped silica glass fine particles are sintered and vitrified.

According to the above treatment, the dopant distribution can be formed in the radial direction of the resulting doped silica glass body, an optical fiber produced by utilizing such the doped silica glass body is remarkably improved in respect of transmission band and transmission loss.

In a method of manufacturing an optical fiber preform, wherein fine glass particles (or quartz powder) to which a dopant was added by dissolving the same into $SiO_2$ are allowed to be deposited and fused by means of flame or plasma flame on the extreme end of the starting material which is rotationally moved, the present invention includes a step that the rotating axis of the aforesaid starting material is inclined by an angle of 5°–90° with respect to the blow-off direction of the flow of the glass fine particles in the flame or plasma flame to obtain a round rod-like transparent doped silica glass body.

In accordance with the present invention, an optical fiber preform having a uniform outer diameter and a uniform boundary surface of the core-clad thereof can be produced at a high synthesizing speed and accordingly, there is an advantage in that the cost of optical fiber which may practically be utilized can be reduced. Furthermore, there is also an advantage in that a preform for single mode optical fiber having an ideal distribution of refractive index and excellent transmission characteristics can be mass produced.

BRIEF DESCRIPTION OF THE DRAWINGS

FIG. 14 is a schematic view showing an embodiment of an apparatus for embodying a heat treatment step in a method of manufacturing doped silica glass according to the present invention;

FIGS. 15A and 15B are sectional views showing one embodiment of a torch employed in the heat treatment of FIG. 14;

FIG. 16A is a schematic view showing one embodiment of an apparatus for effecting the sintering and vitrification in a method of manufacturing doped silica glass according to the invention;

FIG. 16B is a sectional view showing one embodiment of a construction of the torch in the apparatus shown in FIG. 16A;

FIG. 17 is a graphical representation illustrating a distribution of refractive index in a radial direction of the doped silica glass produced by the apparatus shown in FIG. 16A;

FIG. 18A is a schematic view showing one embodiment of an apparatus for embodying a method of manufacturing doped silica glass according to the invention in which a distribution of refractive index in a radial direction of the doped silica glass can be changed;

FIG. 18B is a sectional view showing one embodiment of a construction of the torch in the apparatus of FIG. 18A;

FIGS. 19 and 20 are graphical representations each illustrating a distribution of refractive index in a radial direction of the doped silica glass produced by the method of manufacturing doped silica glass according to the present invention by using the apparatus shown in FIG. 18A;

FIG. 21 is a block diagram illustrating manufacturing steps for forming an $SiO_2$ layer on a surface of a doped silica glass fine particle in accordance with the present invention;

FIGS. 24, 25 and 26 are schematic views for explaining a conventional method of manufacturing an optical fiber preform;

FIG. 27 is a schematic view for explaining Example 7 of a method of manufacturing an optical fiber preform according to the present invention;

DESCRIPTION OF THE PREFERRED EMBODIMENTS

Figure 1:
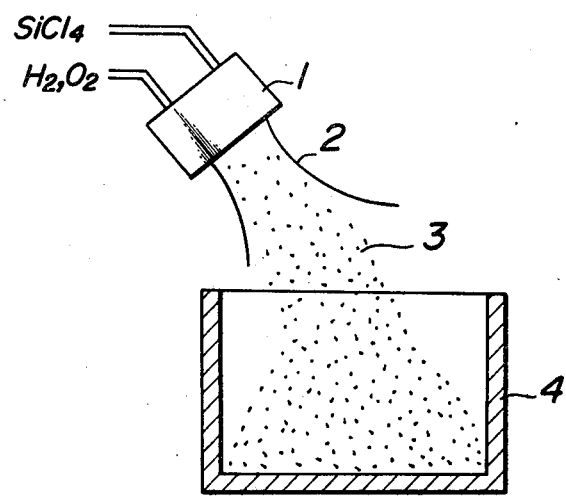
FIGS. 1, 2 and 3 are schematic views showing embodiments of apparatuses embodying a first, a second and a third processes, respectively, in a method of manufacturing doped silica glass according to the present invention.
Figure 2:
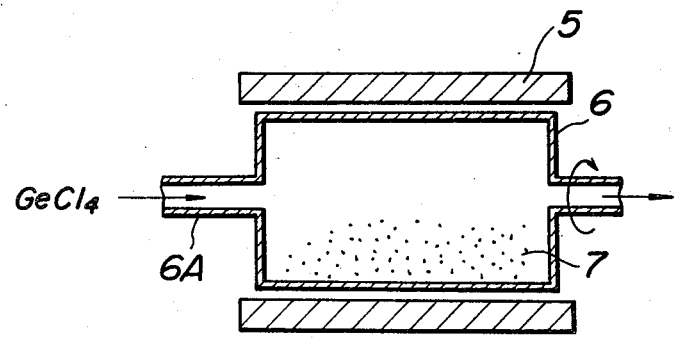
Figure 3:
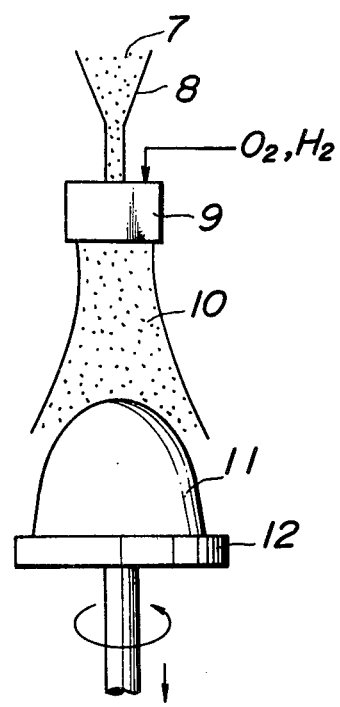

FIGS. 1, 2 and 3 are schematic views showing embodiments of apparatuses embodying a first, a second and a third processes of a method according to this invention, respectively. In FIG. 1 showing the first process, reference numeral 1 designates a synthesizing torch, 2 a flame stream, 3 silica glass fine particles, and 4 a container. In FIG. 2 showing the second process, reference numeral 5 designates a heater element in an electric furnace, 6 a rotating reactor vessel, and 7 doped silica glass fine particles produced in this process. In FIG. 3 showing the third process, reference numeral 7 designates doped silica glass fine particles, 8 a feed opening, 9 a synthesizing torch, 10 a flame stream, 11 a porous doped glass body, and 12 a rotary pulling-down device.

In the first process, $O_2$ gas and $H_2$ gas are supplied to the synthesizing torch 1 together with evaporated and vaporized $SiCl_4$. The $SiCl_4$ gas is hydrolyzed in the flame 2 derived from the synthesizing torch 1 to form $SiO_2$, so that the $SiO_2$ glass fine particles 3 are produced to be deposited in the container 4. Such apparatus for embodying the first process may be constructed in a conventional structure.

Figure 4:
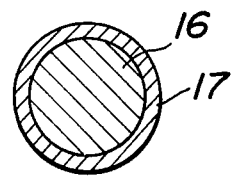
FIG. 4 is a sectional view showing a quartz powder or $SiO_2$ glass fine particle on the surface of which a $SiO_2$—$GeO_2$ layer is formed.

In the second process, the silica glass fine particles 3 produced in accordance with the first process are placed in the reactor 6 rotating as indicated by an arrow in FIG. 2. The interior of the reactor 6 is heated at a temperature of 500°–1,200° C. by means of the heater element 5 for an electric furnace, and, for example, a gas containing an evaporated and vaporized $GeCl_4$, $O_2$ gas or, $H_2O$ and $SiCl_4$ is introduced to the reactor from an inlet 6A thereof, whereby the silica glass fine particles are exposed to the gas to form a $SiO_2$—$GeO_2$ solid solution glass layer 17 containing $GeO_2$ dissolved into $SiO_2$ on the surface of a quartz or glass fine particle 16 as shown in FIG. 4. As a consequence, $GeO_2$ does not evaporate even in case of a high temperature fusion at a temperature of 1,500°–1,700° C. in the third process, but $GeO_2$ is added to the glass body to obtain silica glass doped with $GeO_2$.

In case of thermal hydrolysis, a reaction temperature for exposing the silica glass to the gas for forming doped silica glass is within a range of 500°–1,000° C. If the temperature is less than 500° C., an oxide such as $GeO_2$, $PbO_2$, $SnO_2$ or the like which forms a solid solution together with $SiO_2$ is not obtained on the surface of a quartz or $SiO_2$ glass fine particle, but a crystal oxide such as crystal $GeO_2$ is produced on the surface of the quartz or glass fine particle. Such crystal oxide, e.g., crystal $GeO_2$ easily evaporates during fusion at a high temperature, and in such a case, the doped silica glass cannot be obtained. On the other hand, if a reaction temperature is more than 1,000° C., $GeO_2$, $PbO_2$, $SnO_2$ or the like does not turn into solid phase, so that a glass layer containing such a dopant is not formed. In case of thermal oxidation, a preferable reaction temperature ranges from 800° to 1,200° C. This range is determined as follows. The efficiency in converting $GeCl_4$ to $GeO_2$ becomes 95% or more at 800° C. or more and the upper limit 1,200° C. is determined from the fact that the sintering of a glass fine particle starts at this temperature.

A gaseous additive to be contained in a gas for forming doped silica glass may be any material which can produce an oxide being capable of forming a solid solution together with $SiO_2$ through a reaction with $H_2O$. For example, at least one compound selected from the group consisting of $GeCl_4$, $SnCl_4$, $PbCl_4$, $ZnCl_4$, alkoxide compounds of tin, lead or zinc, $POCl_3$, $PCl_3$, $TiCl_3$, $BBr_3$, $BCl_3$ and the like may be employed as the gaseous additive. In the case where $POCl_3$ alone is utilized, silica glass doped with $P_2O_5$ is produced.

If a dopant (e.g., $GeO_2$) is added to form a solid solution by utilizing surface reaction as mentioned above, it is possible to obtain a uniform concentration of the dopant (e.g., $GeO_2$) in quartz powder or glass fine particles.

As a dehydrating agent, $Cl_2$, $SOCl_2$ or the like may be contained in the gas for forming doped silica glass in addition to $SiCl_4$, $H_2O$ and a gaseous additive. In this case, OH group and $H_2O$ molecules in the quartz powder or $SiO_2$ glass fine powder can be removed.

In the third process, the doped silica glass fine particles from the feed opening 8 and $O_2$ gas as well as $H_2$ gas are supplied to the synthesizing torch 9 and then the doped silica glass fine particles are fused by means of the flame 10 having a temperature of 1,200°–1,400° C., the porous doped glass body 11 is obtained on the rotary pulling-down device 12. The porous doped silica glass body thus obtained is then subjected to deaeration and vitrification by heating the porous doped silica glass at a temperature of 1,500°–1,700° C. in the electric furnace, so that final doped silica glass is produced. If the sintering is carried out by adjusting the temperature of the flame of the synthesizing torch 9 to be within a range of 1,500°–1,700° C., transparent doped silica glass is directly obtained.

It is to be noted that conditions and the like in the vitrification process are not limited to a specific embodiment in the present invention. Furthermore, a plasma flame, high temperature electric furnace or the like instead of $O_2$-$H_2$ flame may effectively be used as heating means in the present invention, and it is clear that the heating means is not limited to those mentioned above.

Figure 5:
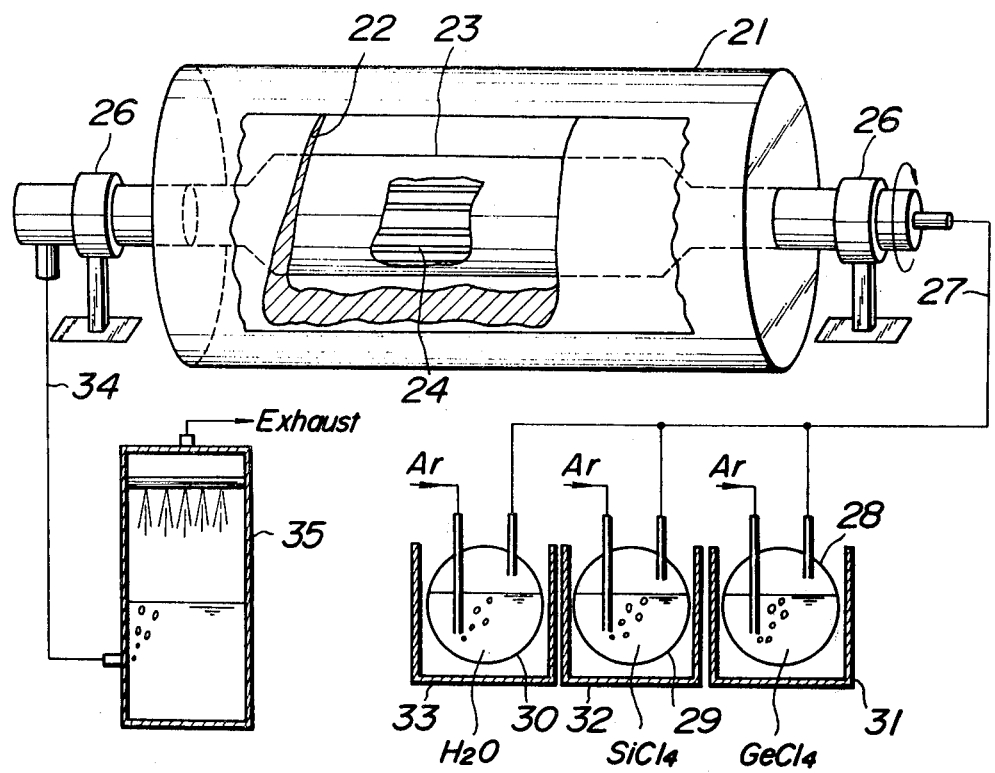
FIG. 5 is a schematic diagram showing a specific construction of the apparatus shown in FIG. 2.
Figure 6:
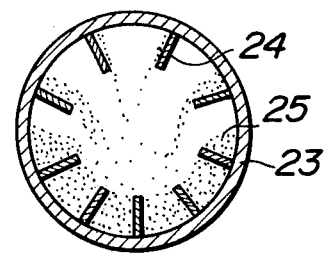
FIG. 6 is a sectional view showing one embodiment of a reaction tube in the apparatus shown in FIG. 5.

Now, a specific embodiment of an apparatus for embodying the dissolution in the second process will be shown in FIG. 5 in which reference numeral 21 designates an electric furnace, and a reaction tube 23 made of quartz glass is disposed inside of a heater element 22 in the electric furnace 21. The reaction tube 23 has a cross section as shown in FIG. 6 and is provided with a plurality of fins 24 each projecting radially inwardly in the tube 23. These fins 24 are arranged in such a way that when the reaction tube 23 is rotated as indicated by an arrow, glass fine particles 25 elevated to an upper position by means of the fins positioned upwardly fall therefrom to be agitated, whereby the glass fine particles are uniformly exposed to a reaction gas. The reaction tube 23 is rotated and driven by means of a rotating motor device 26. Reference numeral 27 designates a feed pipe for feeding reaction gas and through which evaporated and vaporized $GeCl_4$, $SiCl_4$ and $H_2O$ gases are supplied to the reaction tube 23. More specifically, in case where $GeO_2$ is added as a dopant, $GeCl_4$, $SiCl_4$ and $H_2O$ are stored in saturators 28, 29 and 30 respectively, and Ar gas is supplied thereto, thereby producing the above stated evaporated and vaporized $GeCl_4$, $SiCl_4$ and $H_2O$ gases. Temperature regulators 31, 32 and 33 for the respective saturators 28, 29 and 30 function to determine the respective feed rates of the gases. An exhaust pipe 34 transports an exhaust gas from the reaction tube 23. Through the exhaust pipe 34, the exhaust gas is transported to a device 35 for treating exhaust gas in which toxic components are removed from the exhaust gas, so that the resulting gas is exhausted from the device 35.

Figure 7:
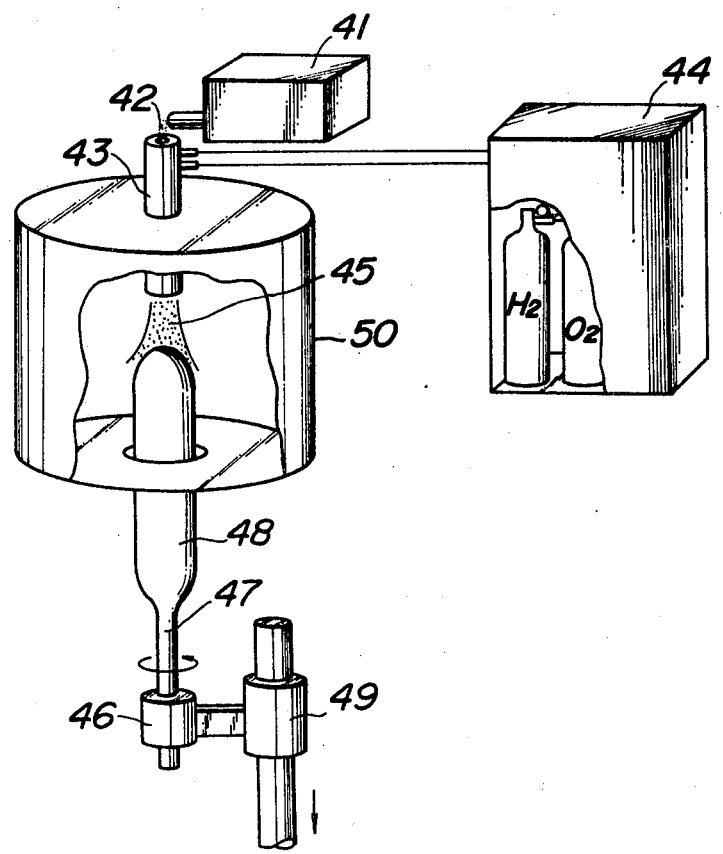
FIG. 7 is a schematic diagram showing a specific construction of the apparatus shown in FIG. 3.

FIG. 7 is a block diagram showing a specific embodiment of an apparatus for vitrifying the doped silica glass fine particles by means of fusion. In FIG. 7, a feeder 41 of glass fine particles feeds the glass fine particles 42 to a fusion torch 43. To the torch 43, $O_2$ and $H_2$ gases are also fed from an $O_2$ and $H_2$ gas feeder 44. The glass fine particles fused by a flame 45 derived from the fusion torch 43 are vitrified and deposited on a starting material rod 47 held by a rotary pulling-down device 46 to form a transparent doped silica glass body 48. In this case, the rotary pulling-down device 46 is arranged in such a way that the device 46 is lowered while rotating around the axis as illustrated by an arrow by means of a pulling-down means 49, so that the transparent glass body 48 is gradually grown. Reference numeral 50 designates a protective container for covering the flame from the torch 43 as well as a growing portion of the transparent glass body.

Dissolution of $GeO_2$ by the apparatus shown in FIG. 5 will be described in detail hereinbelow.

Figure 8:
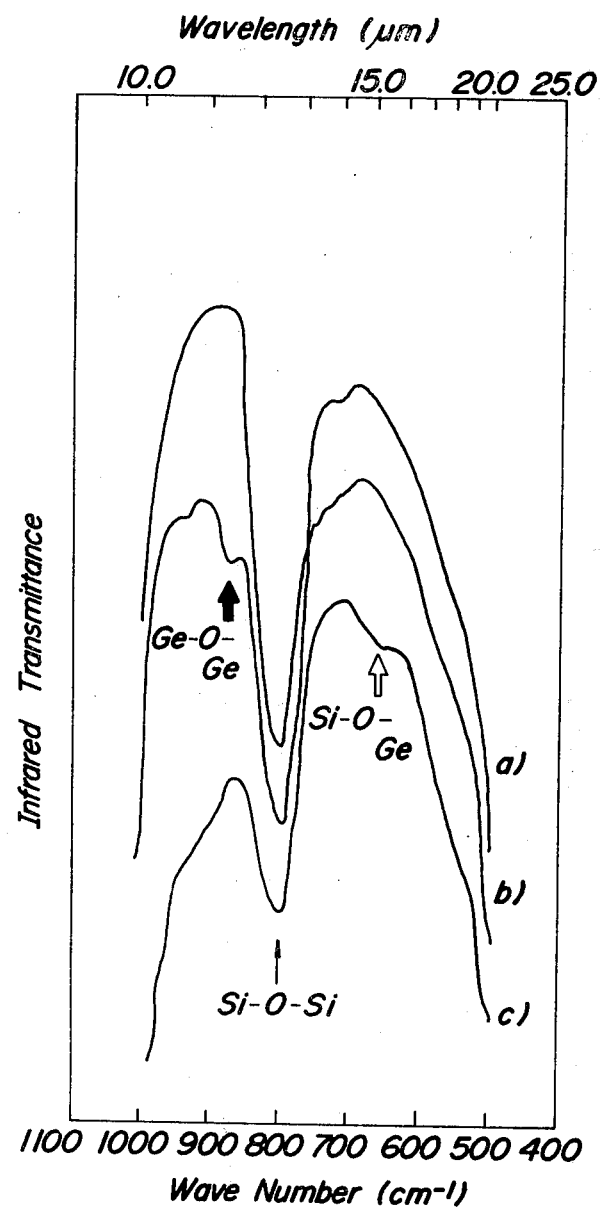
FIG. 8 is a graphical representation illustrating infrared transmittance characteristic of silica glass fine particles when the reaction temperature is changed.
Figure 9:
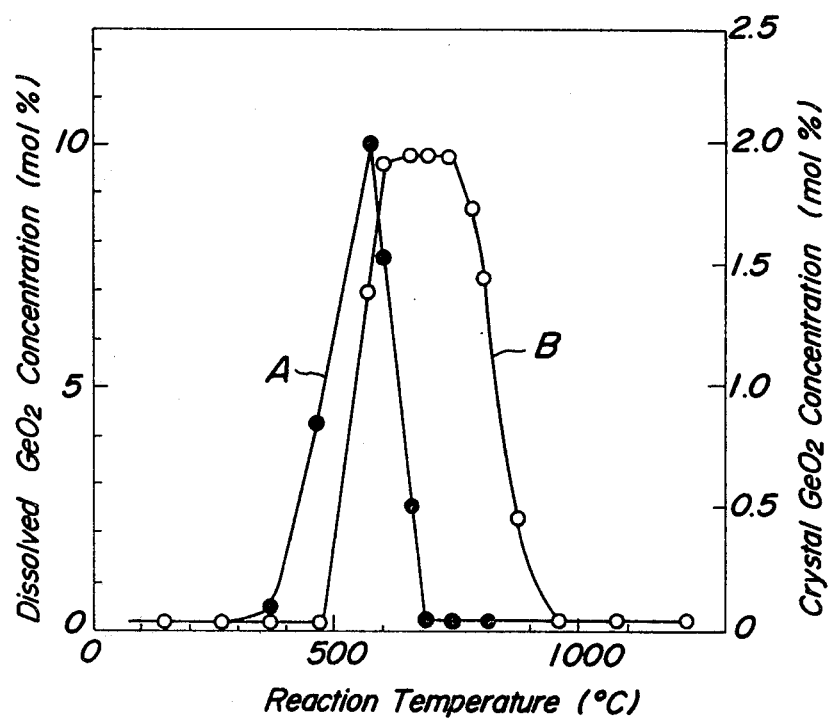
FIG. 9 is a graphical representation illustrating the reaction temperature dependency of an amount of $GeO_2$ dopant.

A typical composition of the gas for forming doped silica glass which is supplied into the reaction tube 23 shown in FIG. 5 consists of 5 mol% of $SiCl_4$, 5 mol% of $GeCl_4$, 20 mol% of $H_2O$ and 70 mol% of Ar. FIGS. 8 and 9 are graphical representations, respectively, of change in amount of dissolved $GeO_2$ in case of varying reaction temperature (°C.) and change in amount of dissolved $GeO_2$ in case of varying the above-mentioned composition of the reaction gas, respectively. The amount of $GeO_2$ dissolved in the reacted glass fine particles are identified by measuring infrared transmittance characteristics of the glass fine particles.

Curves in FIG. 8 demonstrate results obtained by measuring infrared transmittance characteristics of the glass fine particles reacted under conditions at reaction temperatures of (a) 150° C., (b) 370° C., (c) 730° C. Strong absorption lines of the characteristics (a), (b) and (c) at wave number of 800 cm$^{-1}$ are due to Si-O-Si bond, while weak absorption lines of the characteristic (b) at wave length of 870 cm$^{-1}$ and the characteristic (c) at wave length of 660 cm$^{-1}$ are due to Ge-O-Ge bond and Si-O-Ge bond, respectively. In this case, the Ge-O-Ge bond suggests $GeO_2$ which is independent from $SiO_2$, and the Si-O-Ge bond suggests $GeO_2$ dissolved into $SiO_2$. Furthermore, as a result of X-ray diffraction, it became clear that the independent $GeO_2$ had a crystal structure of hexagnoal system, whilst the dissolved $GeO_2$ was non-crystalline.

FIG. 9 illustrates reaction temperature dependency of amounts (concentrations) (mol %) of added independent crystal $GeO_2$ and dissolved $GeO_2$. In FIG. 9, the characteristic curves A and B represent the crystal $GeO_2$ and dissolved $GeO_2$, respectively. From these results, it is understood that only the crystal $GeO_2$ is produced at a reaction temperature of 470° C. or less and both the crystal $GeO_2$ and dissolved $GeO_2$ are produced at a reaction temperature of 470°-690° C., while only the dissolved $GeO_2$ is produced at a reaction temperature of 690°-950° C., and in addition no $GeO_2$ is added at a reaction temperature of 950° C. or more.

Figure 10:
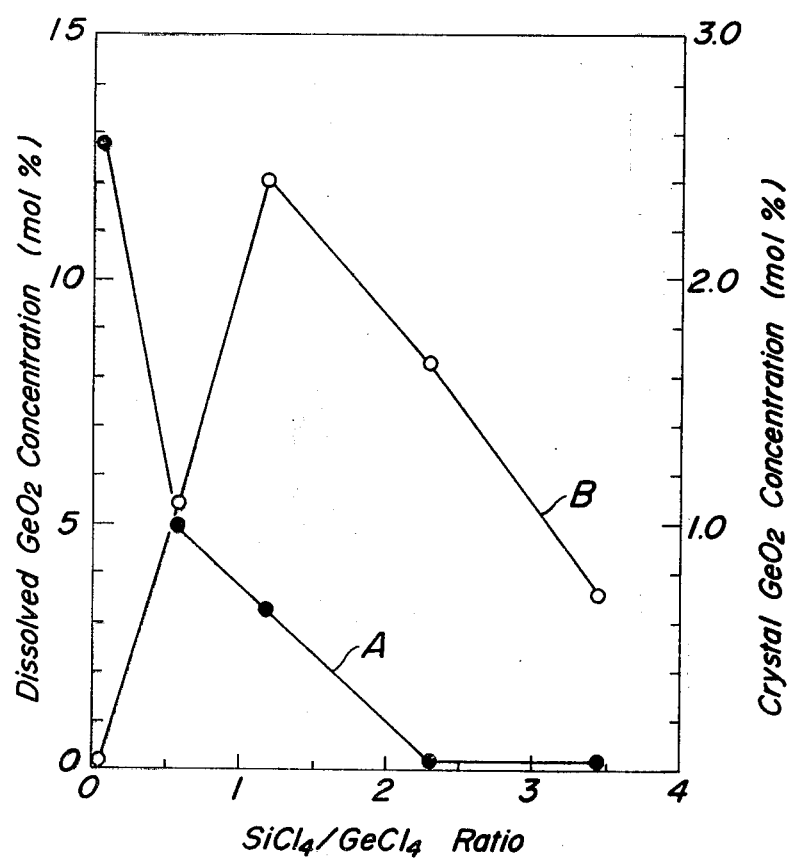
FIG. 10 is a graphical representation illustrating the relationship of an amount of $GeO_2$ dopant with $SiCl_4$/$GeCl_4$ ratio.

FIG. 10 is a graphical representation illustrating changes in amounts (concentrations) (mol %) of added crystal $GeO_2$ and dissolved $GeO_2$ when ratio between $SiCl_4$ gas and $GeCl_4$ gas in the gas for forming doped silica glass is varied at a reaction temperature of 630° C., in which characteristic lines A and B represent cases of the crystal $GeO_2$ and dissolved $GeO_2$, respectively. The crystal $GeO_2$ decreases in accordance with the increase of the ratio of $SiCl_4/GeCl_4$, i.e., the increase of the concentration of $SiCl_4$, whilst the dissolved $GeO_2$ increases in accordance with the increase of the ratio of $SiCl_4/GeCl_4$, and the maximum concentration is obtained when the ratio is about 1. Moreover, it has been ascertained that only the crystal $GeO_2$ is produced when the ration of $SiCl_4/GeCl_4$ is zero, i.e., the concentration of $SiCl_4$ is zero and accordingly no dissolved $GeO_2$ is produced. In this case, the gas for forming doped silica glass may contain an easily oxidizable silicon compound such as $SiH_4$, $SiHCl_4$ or the like in place of $SiCl_4$.

Figure 11:
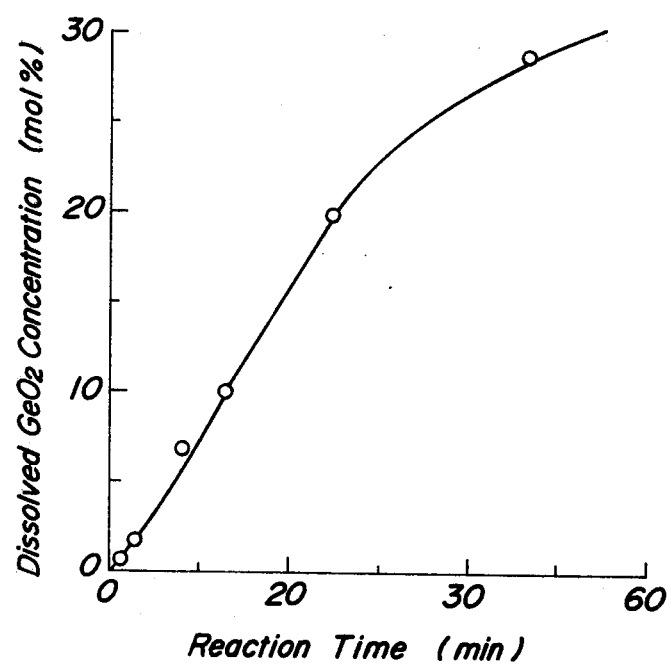
FIG. 11 is a graphical representation illustrating the relationship of a concentration of the dissolved $GeO_2$ with the reaction time.

FIG. 11 is a graphical representation illustrating a depencency of an amount of the added dissolved $GeO_2$ (concentration) (mol %) with respect to a reaction time (minute), in which the amount of the added dissolved $GeO_2$ increases substantially in proportion to the reaction time. Accordingly, it is understood that the amount of the added dissolved $GeO_2$ can be determined to a desired value by adjusting the reaction time and also it is possible to add the dissolved $GeO_2$ with a high concentration.

Figure 12:
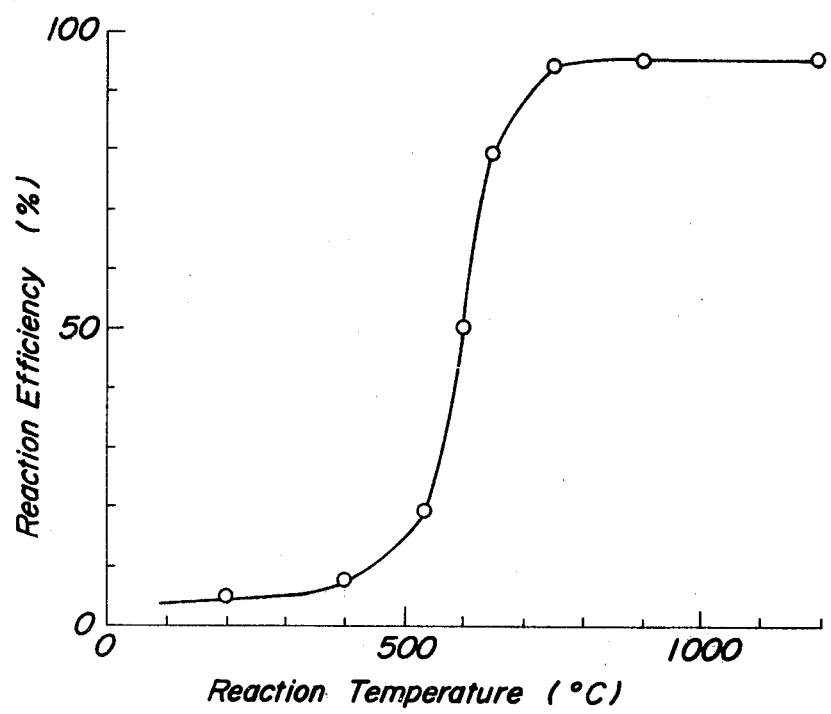
FIG. 12 is a graphical representation illustrating the temperature dependency of a reaction of producing $SiO_2$ from $SiCl_4$.

FIG. 12 is a graphical representation illustrating a reaction efficiency that a raw material $GeCl_4$ is converted to $GeO_2$, from which it is understood that a reaction temperature at which the dissolved $GeO_2$ is produced must be maintained at 800° C. or more in order to obtain an efficiency of 95% or more. On the other hand, the upper limit of the reaction temperature is determined on the basis of a fact that the sintering of glass fine particles commences at a temperature of 1,200° C. or more.

Figure 13:
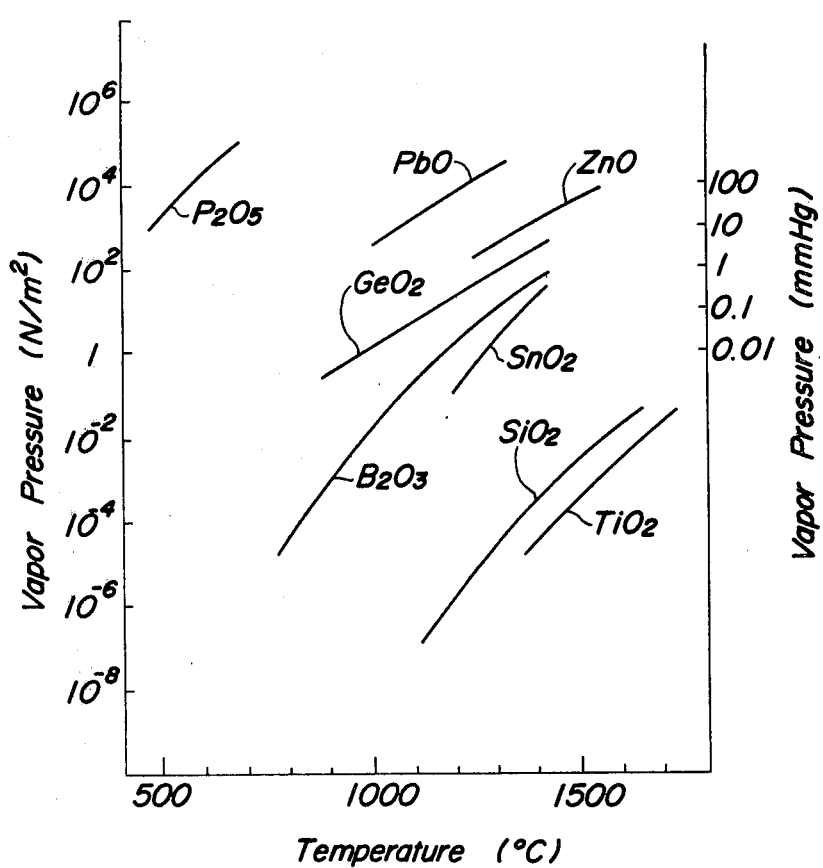
FIG. 13 is a graphical representation illustrating vapor pressure of various dopant oxides with respect to temperature.

Next, explanation will be made on the reason why various dopants ranging from the ones such as Al or Ti which is easily added to the ones such as Sn or Pb which is hardly added can be added to glass fine particles according to the present invention. Whether or not such dopant is added to the glass fine particles closely relates to saturated vapor pressure of a dopant oxide as illustrated in FIG. 13, and in this respect, the dopant is not changed to solid phase in the case where space vapor pressure of the dopant is lower than the saturated vapor pressure, so that the dopant is not added to the glass fine particles. On one hand, when the space vapor pressure becomes higher than the saturated vapor pressure, the dopant is changed into solid phase, so that it is added to the glass fine particles. Thus, in FIG. 13, the lower the saturated vapor pressure of a dopant material, the easier the addition of dopant. However, in a conventional direct vitrification process, a transparent glass body is produced at a high temperature of 1,800°–2,000° C., so that the saturated vapor pressure becomes higher and thus, dopant materials which can be added in solid phase are limited only to $TiO_2$ and $Al_2O_3$. On one hand, in a conventional soot process, it is merely required that glass fine particles are produced and sintered, and consequently, the temperature at which a dopant is added may be adjusted to be 1,000° C. or less. In this case, however, it is difficult to add a dopant material having a higher saturated vapor pressure than that of $GeO_2$, for instance $PbO_2$, $ZnO$ or $P_2O_5$ to the glass fine particles.

On the other hand, in the present invention, the addition of a dopant material may be carried out under an independent condition from those of production of glass fine particles, sintering and vitrification thereof and as a consequence, the addition of $PbO_2$, $ZnO$, $P_2O_5$ or the like is also possible.

Examples of the present invention will be described hereinbelow.

EXAMPLE 1

The rotating reaction vessel 23 shown in FIG. 5 was charged with 1,000 mesh (25 $\mu m\phi$) quartz powder or 1–10 $\mu m$ $SiO_2$ glass fine powder, and such powder was allowed to be exposed to a gas for forming doped silica glass consisting of 10 mol% of $SiCl_4$, 10 mol% of $GeCl_4$, 50 mol% of $H_2O$ and the remainder inert gas at 800° C. for about 5 minutes. Then, $GeO_2$ was added to the quartz powder or $SiO_2$ glass fine powder.

When the resulting powder was jetted from the torch 43 together with the flame 45 shown in FIG. 7 to fuse the powder at a high temperature of 1,500°–1,700° C., so that transparent doped silica glass was obtained on the rotary pulling-down device 46. The resulting doped silica glass contains 10 mol% of $GeO_2$, and this $GeO_2$ content can easily be adjusted by varying the reaction time in the process of FIG. 5, as seen in FIG. 11. In this case, a manufacturing speed of the doped silica glass was 1,000 g per hour.

In the method of producing doped silica glass according to the present invention, there is no factor for restricting the amount of production per unit time. Accordingly, when the apparatus of FIG. 5 is scaled up and a large quantity of $GeO_2$-added quartz powders or $SiO_2$ glass fine particles are manufactured by the scaled-up apparatus and further, when this large quantity of the powder is fused by means of the apparatus in FIG. 7, it is possible to improve the manufacturing speed of the doped silica glass to 1,000–5,000 g per hour. Further, the manufacturing speed in a conventional process is about 100 g/hour, or 500 g/hour at most.

Since an $O_2$-$H_2$ flame is utilized for the fusion in the apparatus shown in FIG. 7, a large amount of OH group (this is a factor of increasing the transmission loss of optical fiber.) is contained in the doped silica glass body 48. Thus, in order to produce doped silica glass containing a small amount of OH group according to the present invention, it is sufficient that first, a dehydrating agent such as $Cl_2$, $SOCl_2$ or the like is supplied together with $SiCl_4$, $GeCl_4$ and $H_2O$ in a process for adding $GeO_2$ to remove OH group and $H_2O$ molecule in the quartz powder or $SiO_2$ glass fine powder, and then vitrification is effected upon the quartz or $SiO_2$ glass powder by means of a plasma flame, a high temperature electric furnace or the like.

While in the present example a transparent doped silica glass body is produced by directly fusing the quartz or $SiO_2$ glass powder after the addition of $GeO_2$ at a high temperature as shown in FIG. 7, the transparent doped silica glass body may be manufactured by vitrifying a porous glass sintered body after the formation of the porous glass sintered body to which $GeO_2$ is added.

As described above, the present invention relates to a method in which quartz powder or $SiO_2$ glass fine particles are exposed to an atmosphere containing $SiCl_4$, a gaseous additive and $H_2O$ to add a dopant to the quartz powder or $SiO_2$ glass fine particles, and then such quartz powder or $SiO_2$ glass fine particles are subjected to a high temperature fusion to produce transparent doped silica glass. This leads to an advantage that the manufacturing speed per unit time can remarkably be improved. In addition, quartz powder may be utilized as a raw material in the invention, so that an inexpensive optical fiber can be produced. Furthermore, there is also such an advantage that the dopant (e.g., $GeO_2$) is uniformly added so that the finally produced doped silica glass has a uniform concentration of $GeO_2$ and accordingly an optical fiber with a low transmission loss can be fabricated.

EXAMPLE 2

In the first process, $O_2$ gas, $H_2$ gas and evaporated and vaporized $SiCl_4$ were supplied to the synthesizing torch 1 with a rate of 10 l/min., 20 l/min. and 1 l/min., respectively. As a result, $SiCl_4$ was oxidized in the flame 2 to form $SiO_2$, and the silica glass fine particles 3 each having a diameter of 0.05–0.2 $\mu m$ were deposited in the container 4 (FIG. 1) at a rate of about 2.6 g/min.

In the second process, the reaction vessel 23 rotating at 15 rpm in the apparatus shown in FIG. 5 was charged with 1 kg of the aforesaid silica glass fine particles 25, and on one hand, $O_2$ gas containing 10 mol% of the evaporated and vaporized $GeCl_4$ was fed from the inlet of the reaction vessel 23 at a rate of 2 l/min. Then, the silica glass fine particles were exposed to this atmosphere at about 1,200° C. for 100 minutes, and as a result, doped silica glass fine particles containing about 10 mol% of $GeO_2$ were obtained.

In the third process, the aforesaid doped silica glass fine particles were supplied at a rate of 10 g/min. from the feeder 41 in the apparatus shown in FIG. 7 to the synthesizing torch 43 to which $O_2$ and $H_2$ gases were also fed at a rate of 10 l/min. and 5 l/min., respectively, so that the doped silica glass fine particles were fused by the flame 45 having a temperature of 1,200°–1,400° C. to form a porous doped glass body on the rotary pulling-down device 46 at a rate of 10 g/min. Moreover, when the sintering was effected at a flame temperature of 1,500°–1,700° C. on the aforesaid doped silica glass fine particles by utilizing a synthesizing torch to which there are supplied $O_2$ gas at 20 l/min. and $H_2$ gas at 10 l/min., a transparent doped silica glass body was obtained. On the other hand, the porous doped silica glass body was then heated in an electric furnace at a temperature of 1,500°–1,700° C., to be vitrified, so that a transparent doped silica glass body was produced.

The doped silica glass body thus obtained was utilized as a core material and embedded in a quartz tube in accordance with the above described method to form an optical fiber preform. The resulting optical fiber preform was subjected to wire drawing to obtain an optical fiber with a low transmission loss of about 5 dB/Km (wavelength of 0.85 μm) was produced.

As apparent from the above description, the present invention, unlike a conventional method of manufacturing doped silica glass, comprises independent steps of producing silica glass fine particles, adding a dopant containing $GeO_2$, and sintering and vitrifying doped silica glass fine particles. Accordingly, the present invention has an advantage in that the manufacturing speed of the doped silica glass can easily be improved, without restriction of the manufacturing speed due to the adjustment of the above respective conditions. Furthermore, there is another advantage in that the dopant content can easily be adjusted, since the step for adding a dopant is independent from the other steps and the adding step is effected by means of dissolution.

Thus, an optical fiber preform with favorable characteristics in which the silica glass doped with $GeO_2$ is utilized as a core material can be mass produced, so that the cost of optical fiber can be reduced in accordance with the present invention.

EXAMPLE 3

First, the rotating reaction vessel 23 in the apparatus shown in FIG. 5 was loaded with the $SiO_2$ glass fine particles 25 each having a diameter of about 1,000 Å to be heated at a temperature of 500°–1,000° C. by means of the heater element 22 of the electric furnace.

Then, an atmospheric gas containing $SiCl_4$, $H_2O$, and an easily oxidizable tin compound or an easily oxidizable lead compound was supplied to the reaction vessel 23, and the glass fine particles 25 were exposed to the atmospheric gas, so that $SnO_2$ (or $PbO_2$) was dissolved into the glass fine particles (the term "dissolution" means that $SnO_2$ or $PbO_2$ is dissolved together with $SiO_2$, so that $SnO_2$ or $PbO_2$ is added to $SiO_2$ glass).

The technical feature of the present invention resides in that $SiCl_4$ is supplied together with at least one compound selected from the group consisting of easily oxidizable tin compounds and easily oxidizable lead compounds such as $SnCl_4$ and $PbCl_4$, and as a result, for example, $SnO_2$ dissolves with $SiO_2$ to be added to the silica glass fine particles.

Silica glass doped with $SnO_2$ was prepared by utilizing the above-mentioned apparatus in accordance with a manner as described hereunder. First, an atmospheric gas containing a gas for forming doped silica glass containing 10 mol% of $SiCl_4$, 10 mol% of $SnCl_4$, 30 mol% of $H_2O$ (and the remainder was inert gas) was fed to the rotating reaction vessel 23 at a rate of 1 l/min., and about 1 kg of $SiO_2$ glass fine particles 25 were exposed to the atmospheric gas at 700° C. for 10 minutes. As a consequence, in this case, about 10 mol% of $SnO_2$ was dissolved into the glass fine particles. On one hand, if $SiCl_4$ was not supplied together with the other atmospheric gas components, $SnO_2$ dissolved with $SiO_2$ was not produced, but only $SnO_2$ crystalline grains were produced.

Further, 1 mol% $SnO_2$ was dissolved with $SiO_2$ when an exposure time of the glass fine particles to the atmospheric gas was 1 minute, and about 20 mol% $SnO_2$ was dissolved when an exposure time was 20 minutes. In this manner, the amount of $SnO_2$ to be dissolved could easily be controlled.

The glass fine particles into which $SnO_2$ was thus dissolved were fed from the feeder 41 to the torch 43 shown in FIG. 7, and the glass fine particles were sintered and vitrified in the flame or plasma flame 45, whereby a transparent doped silica glass body was produced.

The glass fine particles 42 into which 10 mol% of $SnO_2$ (or $PbO_2$) was dissolved were supplied into the flame 45 at a rate of 100 g/min., and the so supplied glass fine particles were subjected to vitrification in the flame by utilizing the apparatus shown in FIG. 7, so that the transparent doped silica glass body 48 was grown at a manufacturing speed of 90 g/min.

An optical fiber having an outer diameter of 125 μm and a core diameter of 50 μm which was fabricated from the transparent doped silica glass body 48 thus obtained by employing the glass body 48 as a core material had a transmission loss of 5 dB/km (wavelength of 0.85 μm).

Moreover, in the apparatus shown in FIG. 7, when a vitrified transparent glass body 48 was produced by utilizing a plasma flame instead of oxyhydrogen flame, an amount of included OH group could be reduced. As a result, an optical fiber fabricated from this vitrified glass body exhibited a transmission loss of 5 dB/km even at a wavelength of 1.3 μm.

As described above, the method of manufacturing doped silica glass according to the present invention has an advantage in that an inexpensive optical fiber can be mass produced, because $SnO_2$ or $PbO_2$ can easily be added to the silica glass powder and the amount of added $SnO_2$ or $PbO_2$ may be adjusted freely. Furthermore, since the step for dissolving $SnO_2$ (or $PbO_2$) with the silica glass powder is independent from the step for vitrifying the doped silica glass, there is also an advantage of an increase in manufacturing speed of the glass body.

A thermal treatment in the present invention will be described in more detail hereinbelow.

According to the method of manufacturing doped silica glass of the invention, a thermal treatment may also be applied to the doped silica glass powder obtained by dissolving a dopant such as $GeO_2$, $SnO_2$, $PbO_2$ or the like into a glass fine powder synthesized by means of flame hydrolysis, thermal oxidation reaction or the like in advance of the deposition and fusion of the doped silica glass powder on the extreme end of the starting material by means of a flame, plasma flame or the like. Upon this thermal treatment, the glass fine particles (500–2,000 Å) adjacent to each other neck together to attain grain growth, and the diameter of the resulting product becomes 1–100 μm.

The manner of the thermal treatment is not basically limited, but may be effected by means of, for instance, a flame, plasma flame or high temperature electric furnace. In case of performing the thermal treatment in a plasma flame or high temperature electric furnace, $Cl_2$, $SOCl_2$ or the like is allowed to be included in the atmosphere, so that $H_2O$ molecule or OH group in the fine particles can be removed simultaneously with the grain growth, so that dehydrous doped silica glass can be obtained.

The temperature of the thermal treatment is preferably within a range of 1,000°–2,000° C. Such range has been determined on the basis of a fact that when the temperature is less than 1,000° C., the size of the resulting doped silica glass powder is not sufficiently large, while when the temperature is more than 2,000° C., the dopant to be added volatilizes off.

Meanwhile, the period for the thermal treatment is preferably within a range of 1 second to 1 hour. If the period is less than 1 second, the size of the resulting doped silica glass powder does not become sufficiently large, whilst even if the thermal treatment is continued over 1 hour, the grain size of the doped silica glass powder does not become larger.

The doped silica glass powder thus thermally treated was jetted into a flame or plasma flame to be deposited and fused onto the extreme end of the starting material, thereby producing transparent doped silica glass.

EXAMPLE 4

FIG. 14 is a schematic sectional view showing one embodiment of an apparatus for thermal treatment embodying the method of manufacturing doped silica glass according to the present invention. In FIG. 14, reference numeral 51 designates a doped silica glass powder, 52 a torch for thermal treatment, 53 a flame, 54 a flow of glass fine particles, and 56 a vessel for storing glass fine particles.

FIGS. 15A and 15B show one embodiment of the torch 52 for thermal treatment in which reference numeral 61 designates an oxyhydrogen gas outlet, and 62 an outlet for blowing off glass fine particles disposed coaxially inside of the oxyhydrogen gas outlet 61.

The doped silica glass powder 51 having a particle diameter of 500–2,000 Å to which 10 mol% of $GeO_2$ was added was supplied to the torch 52 for the thermal treatment at a flow rate of 1 m/sec. with a rate of 100 g/min. by the apparatus shown in FIG. 14, and the flow of glass fine particles 54 was thermally treated by the oxyhydrogen flame 53 having a central temperature of 1,800° C. As a result, the thermally treated glass fine particles 55, each having a diameter of 10–50 μm, were produced at a rate of 100 g/min. in the vessel 56 which is apart by 50 cm from the torch 52.

Further, the fine glass particles 55 thus thermally treated to have a larger particle diameter were deposited and fused onto the extreme end of the starting material 47 by using the flame or plasma flame 45 in the apparatus shown in FIG. 7, thereby to produce the transparent doped silica glass body 48. Thus, no residual air bubble was produced when the fine glass powder was supplied at a rate of 100 g/min., and the amount of the fine glass powder could be increased up to about 500 g/min. without any trouble.

In accordance with the method of manufacturing doped silica glass of the present invention, the fine glass particles were thermally treated to make particle diameter larger prior to the deposition and fusion of the aforesaid glass fine particles onto the extreme end of the starting material, so that the method of the invention has an advantage that a transparent doped silica glass body involving no residual air bubble can be manufactured at a high rate. In addition, there is also another advantage in that an optical fiber product can be made inexpensively if an optical fiber is manufactured by utilizing the doped silica glass thus produced.

In the present invention, after the dissolution of a dopant into the doped silica glass fine particles, the apparatus as shown in FIG. 7 is utilized for sintering and vitrifying the fine glass particles to which the dopant was added. The details of the synthesizing torch in the apparatus are shown in FIGS. 16A and 16B, in which portions corresponding to those in FIG. 7 are designated by the same reference numerals.

As clearly understood from FIGS. 16A and 16B, the synthesizing torch 43 is provided with an outlet 71 for doped silica glass fine particles 73 at the center of the torch 43 and an outlet 72 for flame disposed coaxially therearound. A flow of the doped silica glass fine particles 73 is jetted from the outlet 71 for doped silica glass fine particles to be sintered and vitrified by the flame 45, so that the round rod-like doped silica glass body 48 is formed on the receiving plate 46.

As in the present example where the doped silica glass fine particles 42 containing a uniform amount of added dopant (for example, $GeO_2$) are jetted from the outlet 71 in the synthesizing torch 43 to form the doped silica glass body 48, the distribution of concentration (corresponding to the distribution of refractive index) of the dopant (for example, $GeO_2$) in a radial direction in the round rod-like doped silica glass body 48 is uniform as illustrated in FIG. 17. For this reason, there is a disadvantage in that an optical fiber manufactured by utilizing the aforesaid round rod-like doped silica glass body 48 as a core material for optical fiber preform which is subjected to wire drawing has a transmission band of 50 MHz·km or less.

FIG. 18A is a schematic view showing one embodiment of an apparatus for eliminating the disadvantage as mentioned above and embodying the method of manufacturing doped silica glass according to the present invention, and FIG. 18B is a sectional view of the synthesizing torch in FIG. 18A. In FIGS. 18A and 18B, reference numeral 81 designates a synthesizing torch, 82 an outlet for supplying doped silica glass fine particles with a high doping concentration, 83A and 83B outlets for supplying doped silica glass fine particles with a low doping concentration, 84 an outlet for supplying gas for flame, 85 and 86 the flow of doped silica glass fine particles, 87 a flame, and 88 a doped silica glass body.

As apparent from FIGS. 18A and 18B, the synthesizing torch 81 is provided with the outlet 82 for high concentration doped silica glass fine particles at the center of the torch and the outlets 83A and 83B for low concentration doped silica glass fine particles are disposed on the opposite sides of and adjoining the outlet 82. It is to be noted that the number and positions of such the outlets 82, 83A and 83B are not limited to the specific arrangement as stated above, and may be functionally determined by taking a desired distribution of concentration (distribution of refractive index) of dopant or the like into consideration.

The outlet 84 for supplying a gas for flame is arranged in such a way that the outlets 82, 83A and 83B are surrounded thereby, so that favorable glass fine particles are sintered and vitrified.

While the flow 86 of high concentration doped silica glass fine particles fed from the outlet 82 for high concentration doped silica glass fine particles and the flow 85 of low concentration silica glass fine particles fed from the outlets 83A and 83B for low concentration doped silica glass fine particles are admixed and diffused with each other in the flame flow 87 fed from the outlet 84 for flame gas and on the surface of the doped silica glass body 88 held on the receiving plate 46, the doped silica glass body 88 is formed. As a result, a distribution of dopant concentration in the radial direction is observed in the doped silica glass body 88 thus produced. In this case, when the flame temperature is relatively high, a transparent doped silica glass body is produced, while when the flame temperature is low, a porous doped silica glass body is obtained.

EXAMPLE 5

By utilizing the apparatus shown in FIG. 18A, doped silica glass was produced as described hereunder.

Doped silica glass fine particles into which 10 mol% of $GeO_2$ was dissolved was supplied from the outlet 82 for high concentration doped silica glass fine particles at a rate of 10 g/min., simple silica glass fine particles containing no $GeO_2$ was supplied from the outlets 83A and 83B for low concentration doped silica glass fine particles at a rate of 20 g/min., and $O_2$ gas and $H_2$ gas were supplied from the outlet 84 of flame gas at rates of 10 l/min. and 10 l/min., respectively, whereby the doped silica glass was formed. In this case, transparent round rod-like doped silica glass was produced at a rate of 30 g/min. and the resulting doped silica glass exhibited a distribution of $GeO_2$ concentration (corresponding to distribution of refractive index) as illustrated by the graphical representation in FIG. 19 in which $n_0$ designates refractive index of air, and $n_1$ and $n_2$ are refractive indices of the doped silica glass body in the central portion and outer peripheral portion thereof, respectively. In the present example, $n_1$ and $n_2$ were 1,473 (10 mol% in case being represented by $GeO_2$ concentration) and 1.458, respectively, and the distribution of refractive index was approximately illustrated by the curve in FIG. 19 based on the following equation (3):

$$n(r) = \frac{n_1}{2}\left\{1 - erf\left(\frac{r}{2A}\right)\right\} \quad (3)$$

wherein n(r) is a refractive index at distance r in the radial direction, erf( ) is an error function, and A is a constant. In the distribution of refractive index of FIG. 19, a uniform portion at refractive index $n_2$ indicates a cladding layer in the case where this doped silica glass is used as an optical fiber, and the cladding layer has a function for reducing transmission loss of the optical fiber.

Furthermore, when the degrees of mixing and diffusion in respect of the flows 85 and 86 of the doped silica glass fine particles were adjusted by varying the distance between the synthesizing torch 81 and the surface of the doped silica glass body 88, both distributions of a refractive index represented by curve A (in case where the distance between the synthesizing torch 81 and the surface of the glass body 88 was 10 mm) and a refractive index represented by curve B (in case where the distance between the synthesizing torch 81 and the surface of the glass body 88 was 50 mm) were obtained.

The distribution of the refractive index represented by curve A was approximately a square curve, and when a doped silica glass body having such distribution of refractive index was utilized as a core material for optical fiber preform and subjected to wire drawing, the resulting optical fiber exhibited a transmission band of 500 MHz·km (1.3 μm wavelength) and a transmission loss of 0.5 dB/km (1.3 μm wavelength).

It is to be understood that although flame was utilized for sintering and vitrifying zones of glass fine particles in the present example, a high temperature electric furnace, plasma flame or the like may also be employed.

As described above, by using the synthesizing torch as in the present example, a distribution of $GeO_2$ concentration (distribution of refractive index) can be formed in the radial direction of the round rod-like doped silica glass body produced according to the present invention, and further the shape of the distribution can be controlled. Thus, there is an increase in the transmission band and a decrease in the transmission loss of an optical fiber fabricated by employing the aforesaid round rod-like doped silica glass body. Moreover, when the round rod-like doped silica glass body is used as a volume lens (or rod lens), there is an advantage of image focussing without distortion.

Next, one example of the present invention for remarkably reducing evaporation of a dopant will be described hereinbelow by referring to FIG. 21. FIG. 21 is a block diagram for explaining the manufacturing process of the present example in which reference character $A_1$ designates a quartz powder or $SiO_2$ glass fine particle powder, $B_1$ the quartz powder or $SiO_2$ glass fine particle powder containing a dopant, $C_1$ a material obtained by further forming a $SiO_2$ layer on the aforesaid quartz powder or $SiO_2$ glass fine particle powder containing a dopant, and $D_1$ a doped silica glass body. Further, in FIG. 21, ($a_1$), ($b_1$) and ($c_1$) designate steps for the treatment, respectively, in which ($a_1$) indicates a step for exposing the quartz or $SiO_2$ glass fine particle powder to a raw material gas for forming the doped silica glass at a temperature of 500°–1,000° C., ($b_1$) is a step for exposing the doped quartz or $SiO_2$ glass powder to the atmospheric gas, and ($c_1$) is a step for vitrifying the dopant-containing quartz powder or $SiO_2$ glass fine particle powder with a further $SiO_2$ layer.

First, either the quartz powder or $SiO_2$ glass fine particle powder $A_1$, or the mixture thereof is prepared, and then the above stated step ($a_1$) for treatment is applied thereto.

Step ($a_1$):

As mentioned above, the gas for forming doped silica glass is a material for forming a dopant-$SiO_2$ solid solution on the surface of the quartz powder or $SiO_2$ glass fine particle powder $A_1$ as illustrated in FIG. 20. More specifically, when the quartz powder or $SiO_2$ glass fine particle powder is exposed to gases, for example, $SiCl_4$, $GeCl_4$ and $H_2O$ at a temperature of 500°–1,000° C., a $SiO_2$—$GeO_2$ solid solution glass layer 17 containing $GeO_2$ which is dissolved into $SiO_2$ is formed on the surface of the quartz powder or glass fine particles 16 as shown in FIG. 4. As a result, $GeO_2$ does not evaporate even in case of fusion at a high temperature of 1,500°–1,700° C., but $GeO_2$ is added into the glass body to form $GeO_2$ doped silica glass.

Figure 22:
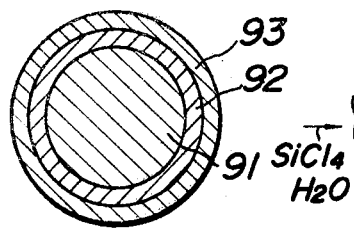
FIG. 22 is a sectional view showing one example of a doped silica glass fine particle obtained by the process illustrated in FIG. 21.

Step ($b_1$):

The glass fine particle powder $B_1$ having the $SiO_2$-dopant solid solution glass layer thus formed was exposed to an atmospheric gas containing $SiCl_4$ and water vapor at a temperature of 500°–1,200° C. The glass fine particle formed by such treatment as stated above is shown in FIG. 22. FIG. 22 is a sectional view showing the glass fine particle produced in accordance with the present example in which reference numeral 91 designates a $SiO_2$ glass fine particle, 92 a $SiO_2$-dopant solid solution glass layer, and 93 a $SiO_2$ glass layer.

In this case, when the reaction temperature is less than 500° C., $SiCl_4$ hardly reacts with $H_2O$ to produce $SiO_2$, as seen in FIG. 12, whilst when the temperature is more than 1,200° C., particles fuse one another so that it is difficult to form an $SiO_2$ layer on each surface of the particles.

In the present example, since the $SiO_2$ glass layer 93 is further formed on the surface of the $SiO_2$-dopant solid solution glass layer 92 as mentioned above, volatilization of a dopant (e.g., $GeO_2$) can be prevented at the time of sintering and vitrification of the $SiO_2$ glass fine particle powder.

A dehydrating agent such as $Cl_2$, $SOCl_2$ or the like may be included in the atmospheric gas.

Step ($c_1$):

The dopant-containing quartz powder or $SiO_2$ glass fine particle powder $B_1$ thus formed is subjected to thermal fusion (for example, heating at a temperature of 1,500°-1,700° C.) to vitrify the powder. In case of this vitrification, either the quartz powder or $SiO_2$ glass fine particle powder $B_1$ may directly be vitrified, or once a porous glass sintered body was formed and then the sintered body may be fused and vitrified to produce a transparent doped silica glass. In other words, manners, conditions and the like in the vitrification process are not limited in the present invention.

As a heating means, a plasma flame, high temperature electric furnace or the like may effectively be utilized instead of $O_2$-$H_2$ flame, but it is obvious that the heating medium is not limited to those enumerated above.

EXAMPLE 6

Figure 23:
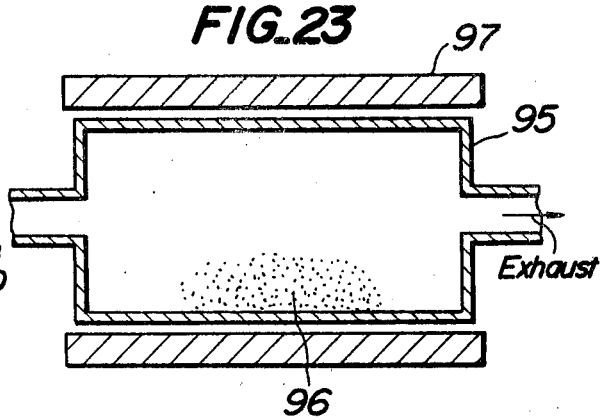
FIG. 23 is a schematic sectional view showing one embodiment of an apparatus for embodying the process illustrated in FIG. 21.

FIG. 23 is a sectional schematic view showing an apparatus to be utilized for the step ($b_1$) of forming a $SiO_2$ glass layer. In FIG. 23, reference numeral 95 designates a rotating vessel, 96 glass fine particles each having a $SiO_2$—$GeO_2$ glass layer, and 97 a heater element for an electric furnace. For the apparatus of FIG. 23, the apparatus shown in FIG. 5 can practically be applied.

The rotating vessel 95 was loaded with the glass fine particles 96 having a $SiO_2$—$GeO_2$ glass layer (to which 10 mol% $GeO_2$ was added), and the glass fine particles 96 were exposed to an atmospheric gas containing $SiCl_4$ (10 mol%) and water vapor (20 mol%) for about 10 minutes at a temperature of 500°-1,200° C. derived from heat generation by means of the heater 97 to form a $SiO_2$ glass layer on the $SiO_2$—$GeO_2$ solid solution glass layer. Thereafter, the resulting product was sintered and vitrified by a flame or plasma flame at a temperature of 1,500°-1,700° C. The $GeO_2$ concentration in the resulting doped silica glass body was about 10 mol%, and there was no volatilization of $GeO_2$ involved in the sintering and vitrification of the glass fine particles.

On one hand, when the $SiO_2$ glass layer which was not formed on the $SiO_2$—$GeO_2$ solid solution glass layer was sintered and vitrified at a temperature of 1,500°-1,700° C., the resulting transparent doped silica glass body had $GeO_2$ of about 5 mol% concentration and this concentration was about half of that at the time of the glass fine particle powder.

As described above, this invention relates to a method in which doped silica glass fine particles into which $GeO_2$ is dissolved are further exposed to an atmospheric gas containing $SiCl_4$ and $H_2O$ at a temperature of 500°-1,200° C., whereby a $SiO_2$ glass layer is formed on the surface of the aforesaid doped silica glass fine particles. Accordingly, the present invention has an advantage in that the volatilization of $GeO_2$ at the time of sintering and vitrification is prevented, so that the transparent doped silica glass having a desired $GeO_2$ concentration can be produced. In addition, according to the present invention, there is also such an advantage that the volatilization of $GeO_2$ is prevented in case of a dehydrating treatment by means of $Cl_2$, $SOCl_2$, or the like which carries out the removal of OH group and $H_2O$ molecule in the glass fine particles, and therefore a doped silica glass body containing a low OH ion can be obtained.

A method of manufacturing an optical fiber preform according to the present invention will be described hereinbelow.

Figure 24:
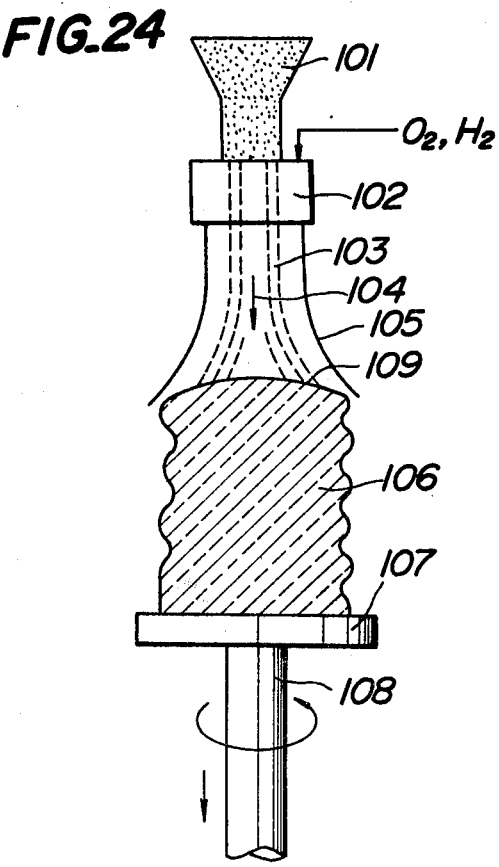

Heretofore, use has been made of the apparatus shown in FIG. 24, 25 or 26 to manufacture an optical fiber preform from glass fine particles (or a quartz powder) to which at least one dopant material selected from the group consisting of $GeO_2$, $SnO_2$, $PbO_2$, $P_2O_5$ and the like was added by dissolving the same into the glass fine particles (or quartz powder) (more specifically, such addition is effected by combining a dopant material with $SiO_2$ like in the form of Si-O-Ge). In FIGS. 24, 25 and 26, reference numerals 101, 121 and 131 designate silica glass fine particles (or a quartz powder), 102, 122 and 132 synthesizing torches, 103 a flow of the glass fine particles, 104 an arrow for indicating a blow-off direction in the flow 103 of glass fine particles, 105 a flame or plasma flame, 106 a doped silica glass body, 107, 127 and 137 starting materials, 108, 128 and 138 rotating shafts, 123 and 133 silica glass fine particles having different composition from that of the aforesaid glass fine particles 121 and 131, 124 and 134 torches for clad, 125 and 135 core glass bodies, and 126 and 136 clad glass bodies.

In order to manufacture an optical fiber preform by using the apparatus shown in FIG. 24, the glass fine particles 101 are blown off together with oxygen and hydrogen (in case of using a flame) from the torch 102 as the flow 103 of the glass fine particles in a direction indicated by the arrow 104. The glass fine particles 101 are deposited on the extreme end of the starting material 107 by means of a flame produced from oxygen and hydrogen (plamsa flame may also be utilized), and then, the so deposited glass fine particles are fused to form a transparent doped silica glass body. In this case, the rotating shaft 108 for the starting material 107 was in line with or parallel to the blow-off direction 104 of the flow 103 of the glass fine particles in the flame or plasma flame 105.

When the doped silica glass body 106 was manufactured in accordance with the manner as set forth in the above, the fusion temperature at the central and peripheral portions on a growing-up plane of the glass body were remarkably different from one another, so that fluctuations in an outer diameter of the resulting glass body became remarkable, and therefore it was required to grind the outer periphery of the resulting glass body in order to employ the glass body as an optical fiber preform.

Furthermore, there has been proposed another method as shown in FIG. 25 or 26 in which the core synthesizing torch 122 (or 132) and cladding torch 124 (134) were employed and the core fine glass particles 121 (or 131) were blown off from the core torch 122 (or 132), while the cladding fine glass particles 123 (or 133) were blown off from the cladding torch 124 (or 134), whereby a glass body in which the clad glass body 126

(or 136) was formed around the core glass body 125 (or 135) was produced on the starting material 127 (or 137).

However, in accordance with this method, there is a disadvantage in that the boundary surface between the core glass body 125 and the clad glass body 126 becomes non-uniform, and thus it is very difficult to obtain a practical optical fiber preform.

Therefore, the present invention contemplates a method of manufacturing an optical fiber preform without such accompanying disadvantages as mentioned above.

According to a method of manufacturing an optical fiber preform of this invention, the rotating axis of the starting material is inclined with an angle of 5°–90° with respect to the blow-off direction of glass fine particles in the case where the glass fine particles or quartz powders are blown off together with a flame or plasma flame to deposit and fuse the particles on the extreme end of the starting material. As indicated in the undermentioned Example 7, fusion temperatures on a glass growing-up surface are substantially identical to one another at a central and peripheral portions thereof, so that an accuracy in an outer diameter of the resulting glass body 146 is remarkably improved by providing the inclination of an angle within such range as stated above, and preferably the angle is within a range of 30°–70°.

EXAMPLE 7

FIG. 27 is a schematic view showing typically an embodiment of the method of manufacturing an optical fiber preform according to the invention. In FIG. 27, reference numeral 141 designates glass fine particles or quartz powder, 142 a torch, 143 a flow of the glass fine particles, 144 an arrow indicating a blow-off direction of the glass fine particles, 145 a flame or plasma flame, 146 a doped silica glass body, 147 a starting material and 148 a rotating axis.

As clearly understood from FIG. 27, the glass fine particles or quartz powders 141 in which a dopant material such as $GeO_2$, $SnO_2$, $PbO_2$, $P_2O_5$ or the like was dissolved into $SiO_2$ are supplied to the torch 142 to be blown off as the flow 143 of the glass fine particles into the flame or plasma flame 145 in the direction indicated by the arrow 144. The flow 143 of glass fine particles thus blown off is deposited and fused on the extreme end of the starting material 147 to produce the round rod-like transparent doped silica glass body 146.

In this case, an angle $\theta$ formed by the rotating axis 148 of the starting material 147 and the blow-off direction 144 of the glass fine particles 143 is adjusted to a value within a range of 5°–90°. By the provision of the inclination with such an angle $\theta$, fusion temperatures on the growing-up surface 149 of the glass body become substantially identical to each other at a central and peripheral portions thereof, so that accuracy in the outer diameter of the resulting glass body 146 is remarkably favorable.

Figure 28:
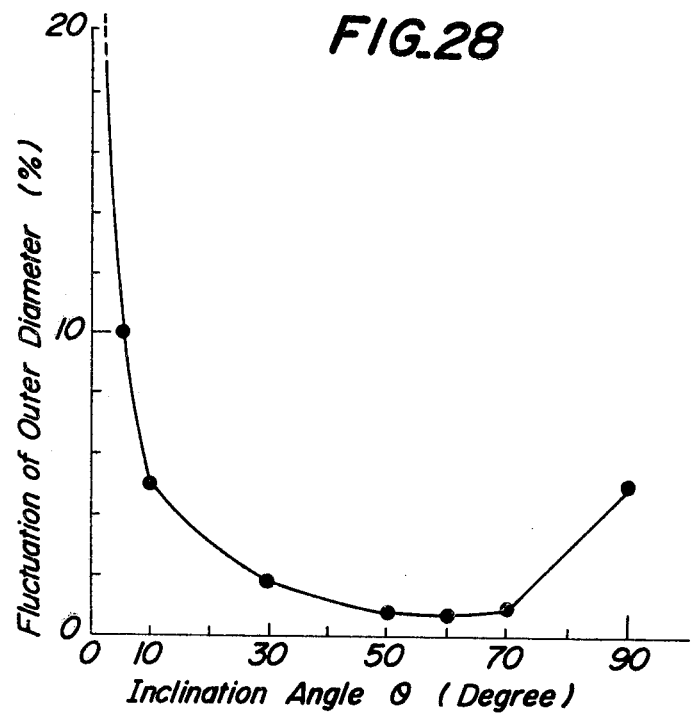
FIG. 28 is a graphical representation illustrating changes of fluctuation of an outer diameter of a glass body with respect to an inclination angle $\theta$ of the optical fiber preform produced in Example 7.

FIG. 28 is a graphical representation showing results in the measurement of variations in fluctuation (%) of outer diameter of the glass body 146, while this angle $\theta$ of inclination is taken as a parameter. This fluctuation in the outer diameter relates to a concept represented by the following equation (4).

Fluctuation in outer diameter (%) = (4)

-continued
{Fluctuation width (mm)/Average outer diameter (mm)} × 100

As apparent from FIG. 28, favorable results were obtained. That is, when the angle $\theta$ of inclination was within a range of 5°–90°, fluctuation in outer diameter was 10% or less and particularly when the angle $\theta$ was within a range of 30°–70°, fluctuation in outer diameter was 2% (±1%) or less. In addition, by such arrangement having the inclination angle, growing-up rate of such glass body 146 is also improved, and as a result, when the angle $\theta$ of inclination was within a range of 30°–70°, the growing-up rate was about 5 times faster than that where the angle $\theta$ of inclination was 0°.

EXAMPLE 8

Figure 29:
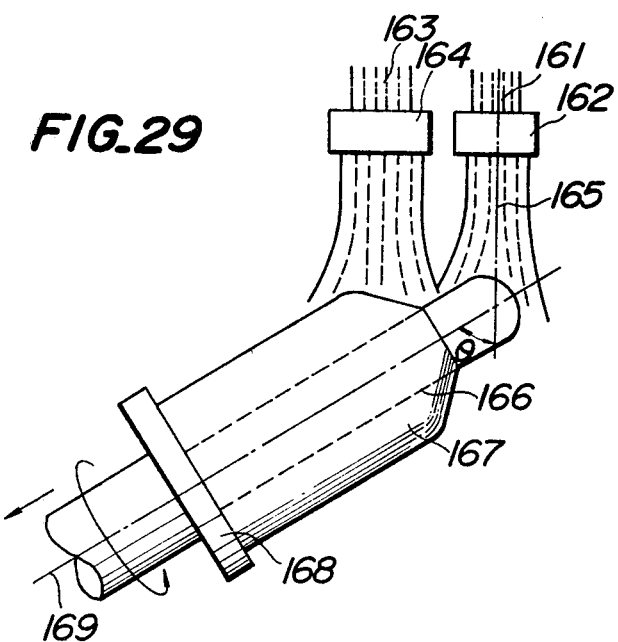
FIG. 29 is a schematic view for explaining Example 8 of the present invention.

FIG. 29 is a schematic view for explaining typically Example 8 according to the present invention in which reference numeral 161 designates glass fine particles, 162 a core torch, 163 glass fine particles the composition of which differs from that of the glass fine particles 161, 164 a clad torch, 165 an arrow indicating the blow-off direction of the glass fine particles, 166 a core glass body, 167 a clad glass body, 168 a starting material and 169 a rotating axis of the starting material.

The glass fine particles 161 into which a dopant was dissolved were supplied to the core torch 162 to fabricate the core glass body 166, and on the other hand the glass fine particles 163 the composition of which differs from that of the glass fine particles 161 were supplied to the clad torch 164 to synthesize the clad glass body 167 around the aforesaid glass body 166, whereby an optical fiber preform having a uniform dimension in the outer diameter thereof was produced.

In this case, an angle $\theta$ of inclination of the rotating axis 169 of the starting material 168 with respect to the blow-off direction 165 of the glass fine particles was 50° C. Further, the glass fine particles 161 into which 10 mol% of $GeO_2$ was dissolved and the other glass fine particles 163 consisting of $SiO_2$ alone were supplied to the torches 162 and 164 at respective rates of 10 g/min. and 63 g/min. As a result, an optical fiber preform composed of the core glass body 166 having a diameter of 40 mm and the clad glass body 166 having an outer diameter of 100 mm was obtained at a rate of 70 g/min. In this case, the growing-up rate in the axial direction was about 3.6 mm/min. and the fluctuation in the outer diameter was ±1% or less.

Figure 30:
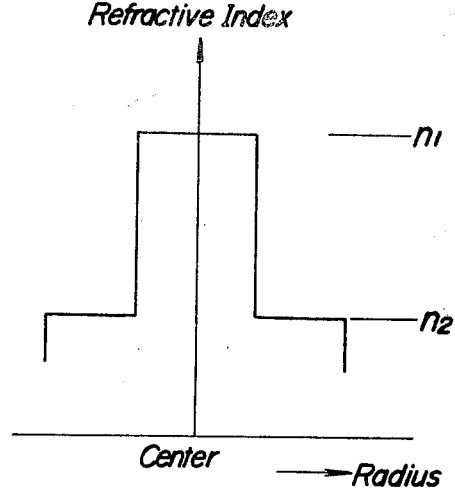
FIG. 30 is a graphical representation illustrating a distribution of refractive index of the optical fiber preform produced in Example 8.

FIG. 30 is a graphical representation illustrating distribution of a refractive index in the optical fiber preform obtained in the present example, in which $n_1$ and $n_2$ were 1.4756 and 1.458 (refractive index of quartz), respectively, and difference in specific refractive indices $\Delta n[=(n_1-n_2/n_2)\times 100]$ was about 1%. Moreover, fluctuation of refractive index in the core glass body was extremely small, and in addition a refractive index in the clad glass body was uniform, so that there was observed no so-called "tail" of refractive index, but it exhibited a favorable step type distribution of refractive index.

EXAMPLE 9

Figure 31:
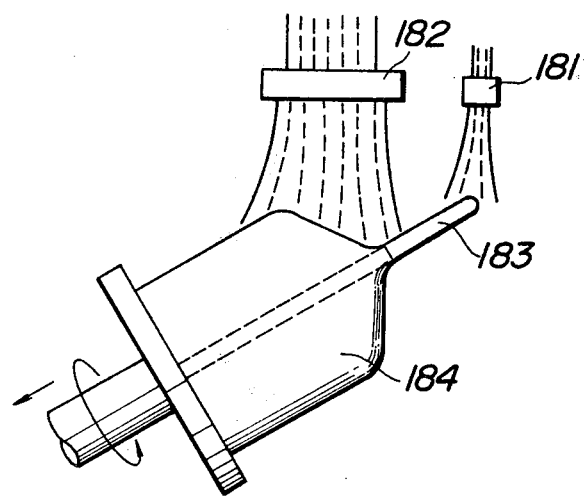
FIG. 31 is a schematic view for explaining Example 9 of the present invention.

FIG. 31 is a schematic view showing typically Example 9 which illustrates a method of manufacturing an optical fiber preform according to the present invention. In FIG. 31, reference numeral 181 designates a core torch, 182 a clad torch, 183 a core glass body with a small diameter, and 184 a clad glass body with a thick thickness.

As clearly understood from FIG. 31, the core glass body 183 ($\Delta n=0.2-1$) with a relatively small diameter was previously fabricated. On the side of the core glass body 183, the thick clad glass body 184 (having a diameter 15–20 times larger than the diameter of the core) was synthesized by means of the large-sized clad torch 182, whereby a transparent preform for single mode optical fiber was obtained. In this case, there was no "tail" in the clad portion, which appeared slightly in the VAD method, as shown in FIG. 30, no dipping at the central portion, which was seen in MCVD method, was also observed, so that an ideal distribution of refractive index for single mode was obtained.

Furthermore, when glass fine particles were deposited and fused by employing a heat source such as a plasma flame or the like which can prevent inclusion of OH group in the above example, an anhydrous optical fiber preform was obtained, so that optical transmission loss could remarkably be reduced.

According to the present invention, as described above, there is an advantage in that an optical fiber preform having a uniform dimension in outer diameter as well as boundary surface between the core and the clad can be produced at a high synthesizing rate, and thus the cost of the optical fiber which may practically be reduced. Furthermore, there is an advantage in that a preform for single mode optical fiber having an ideal distribution of refractive index and excellent transmission characteristics can be mass produced.

What is claimed is:

1. A method of manufacturing doped silica glass, comprising the steps of:
   providing either silica glass fine particles or quartz powder produced by subjecting an easily oxidizable silicon compound to thermal oxidation or flame hydrolysis;
   dissolving a dopant oxide into said silica glass fine particles or said quartz powder by means of oxidation of a gas for forming doped silica glass on the surfaces of said silica glass fine particles or said quartz powder to form doped silica glass fine particles or doped quartz powder; and
   sintering to vitrify said doped silica glass fine particles or said doped quartz powder to form doped silica glass.

2. A method of manufacturing doped silica glass as claimed in claim 1, wherein said silica glass fine particles or said quartz powder are exposed to said gas for forming doped silica glass containing an easily oxidizable silicon compound, a gaseous additive of an easily oxidizable compound for producing a dopant which is capable of forming a solid solution with said silica glass fine particles or said quartz powder through a reaction with water vapor or oxygen, and water vapor or oxygen at a reaction temperature within a range of 500°–1,200° C. to form said doped silica glass fine particles or said doped quartz powder by thermal oxidation.

3. A method of manufacturing doped silica glass as claimed in claim 2, wherein said gaseous additive is at least one easily oxidizable compound selected from a group consisting of easily oxidizable germanium, phosphorus, titanium, and boron compounds.

4. A method of manufacturing doped silica glass as claimed in claim 3, wherein said easily oxidizable germanium compound is $GeCl_4$, said easily oxidizable phosphorus compound is $POCl_3$ or $PCl_3$, said easily oxidizable titanium compound is $TiCl_4$, and said easily oxidizable boron compound is $BBr_3$ or $BCl_3$.

5. A method of manufacturing doped silica glass as claimed in claim 2, wherein said easily oxidizable silicon compound is selected from a group consisting of $SiCl_4$, $SiH_4$ and $SiHCl_4$.

6. A method of manufacturing doped silica glass as claimed in claim 2, wherein a dehydration treating gas containing a chlorine compound is included in said gaseous additive.

7. A method as in claim 6, wherein said chlorine compound is chosen from the group consisting of $SOCl_2$ and $Cl_2$.

8. A method of manufacturing doped silica glass as claimed in claim 1, wherein said silica glass fine particles or said quartz powder are exposed to said gas for forming doped silica glass containing an easily oxidizable silicon compound, a gaseous additive of an easily oxidizable compound for producing a dopant which is capable of forming a solid solution with said silica glass fine particles or said quartz powder through a reaction with water vapor or oxygen, and water vapor or oxygen at a reaction temperature which is adjusted to be within a range of 500°–1,000° C. to form said doped silica glass fine particles or said doped quartz powder by thermal hydrolysis.

9. A method of manufacturing doped silica glass as claimed in claim 1, wherein said doped silica glass fine particles or said doped quartz powder are sintered to be vitrified directly at a temperature within a range of 1,500°–1,700° C.

10. A method of manufacturing doped silica glass as claimed in claim 1, wherein said doped silica glass fine particles or said doped quartz powder are fused at a temperature within a range of 1,200°–1,400° C. to obtain a porous doped silica glass body, which is then sintered to be vitrified at a temperature within a range of 1,500°–1,700° C.

11. A method of manufacturing doped silica glass as claimed in claim 1, wherein quartz powder is utilized.

12. A method of manufacturing doped silica glass as claimed in claim 1, wherein said easily oxidizable silicon compound is subjected to said thermal oxidation or flame hydrolysis to form said silica glass fine particles or said quartz powder, then an easily oxidizable compound for forming dopant including principally an easily oxidizable germanium compound is thermally oxidized on the surfaces of said silica glass fine particles or said quartz powder to dissolve dopant oxides containing principally germanium dioxide into said silica glass fine particles or said quartz powder, and thereafter the resulting doped silica glass fine particles or doped quartz powder are sintered to be vitrified to form doped silica glass containing principally germanium dioxide as dopant.

13. A method of manufacturing doped silica glass as claimed in claim 1, wherein said doped silica glass fine particles or said doped quartz powder are exposed to an atmospheric gas containing $SiCl_4$ and water vapor at a temperature within a range of 500°–1,200° C. to cover the surfaces of said doped silica glass fine particles or doped quartz powder with $SiO_2$ layers, respectively, and then the resulting doped silica glass fine particles or doped quartz powder thus covered with $SiO_2$ layers are sintered to be vitrified.

14. A method of manufacturing doped silica glass as claimed in claim 13, wherein a dehydration treating gas containing a chlorine compound is included in said atmospheric gas containing $SiCl_4$ and water vapor.

15. A method of manufacturing doped silica glass as claimed in claim 1, wherein separate groups of doped silica glass fine particles or doped quartz powder having different amounts of dissolved dopant are jetted respectively from separate feed openings to control a distribution in concentration of dopant, and then said doped silica glass fine particles or said doped quartz powders are sintered and vitrified.

16. A method of manufacturing doped silica glass as claimed in claim 1, wherein said silica glass fine particles are agitated to be exposed to said gas for forming doped silica glass.

17. A method of manufacturing doped silica glass, comprising the steps of:
exposing quartz powder to a gas for forming doped silica glass containing $SiCl_4$, a gaseous additive for producing a dopant which is capable of forming a solid solution with $SiO_2$ by reacting with $H_2O$, and water vapor to form a $SiO_2$-dopant solid solution, and
vitrifying the resulting $SiO_2$-dopant solid solution.

* * * * *